(12) United States Patent
Ito

(10) Patent No.: US 8,908,062 B2
(45) Date of Patent: Dec. 9, 2014

(54) FLARE DETERMINATION APPARATUS, IMAGE PROCESSING APPARATUS, AND STORAGE MEDIUM STORING FLARE DETERMINATION PROGRAM

(75) Inventor: Yuichi Ito, Tokyo (JP)

(73) Assignee: Nikon Corporation, Tokyo (JP)

( * ) Notice: Subject to any disclaimer, the term of this patent is extended or adjusted under 35 U.S.C. 154(b) by 101 days.

(21) Appl. No.: 13/532,270

(22) Filed: Jun. 25, 2012

(65) Prior Publication Data
US 2013/0002902 A1   Jan. 3, 2013

Related U.S. Application Data

(60) Provisional application No. 61/604,694, filed on Feb. 29, 2012.

(30) Foreign Application Priority Data

Jun. 30, 2011 (JP) ................................. 2011-145705

(51) Int. Cl.
    *H04N 9/73* (2006.01)
    *H04N 9/67* (2006.01)
    *H04N 5/357* (2011.01)
    *H04N 5/217* (2011.01)

(52) U.S. Cl.
    CPC .............. *H04N 5/3572* (2013.01); *H04N 9/67* (2013.01); *H04N 9/735* (2013.01)
    USPC ...................... 348/223.1; 348/225.1; 348/241

(58) Field of Classification Search
    CPC ....... H04N 5/21; H04N 5/2175; H04N 9/045; H04N 9/735
    USPC ............................ 348/223.1–226.1, 241–242
    See application file for complete search history.

(56) References Cited

U.S. PATENT DOCUMENTS

| | | | |
|---|---|---|---|
| 2005/0093992 A1* | 5/2005 | Fukumoto | 348/222.1 |
| 2009/0046172 A1* | 2/2009 | Rao et al. | 348/226.1 |
| 2009/0147098 A1* | 6/2009 | Li | 348/223.1 |
| 2009/0207264 A1 | 8/2009 | Utsugi | |

FOREIGN PATENT DOCUMENTS

JP       A-2009-303194       12/2009

\* cited by examiner

*Primary Examiner* — Kelly L Jerabek
(74) *Attorney, Agent, or Firm* — Oliff PLC

(57) ABSTRACT

A flare determination apparatus includes an image input unit inputting an image, an image correction unit correcting the image using a correction coefficient to be set based on a gain value for white balance processing depending on a light source type, a region detection unit detecting a region included in a predetermined color component range from the image being corrected by the image correction unit, and a determination unit determining whether or not a flare is generated in the region being detected by the region detection unit.

11 Claims, 14 Drawing Sheets

Fig.3

HORIZONTAL SCANNING DIRECTION →

VERTICAL SCANNING DIRECTION ↓

| R11 | G12 | R13 | G14 | R15 | G16 | R17 | G18 |
|-----|-----|-----|-----|-----|-----|-----|-----|
| G21 | B22 | G23 | B24 | G25 | B26 | G27 | B28 |
| R31 | G32 | R33 | G34 | R35 | G36 | R37 | G38 |
| X41 | Y42 | X43 | Y44 | X45 | Y46 | X47 | Y48 |
| R51 | G52 | R53 | G54 | R55 | G56 | R57 | G58 |
| G61 | B62 | G63 | B64 | G65 | B66 | G67 | B68 |
| R71 | G72 | R73 | G74 | R75 | G76 | R77 | G78 |

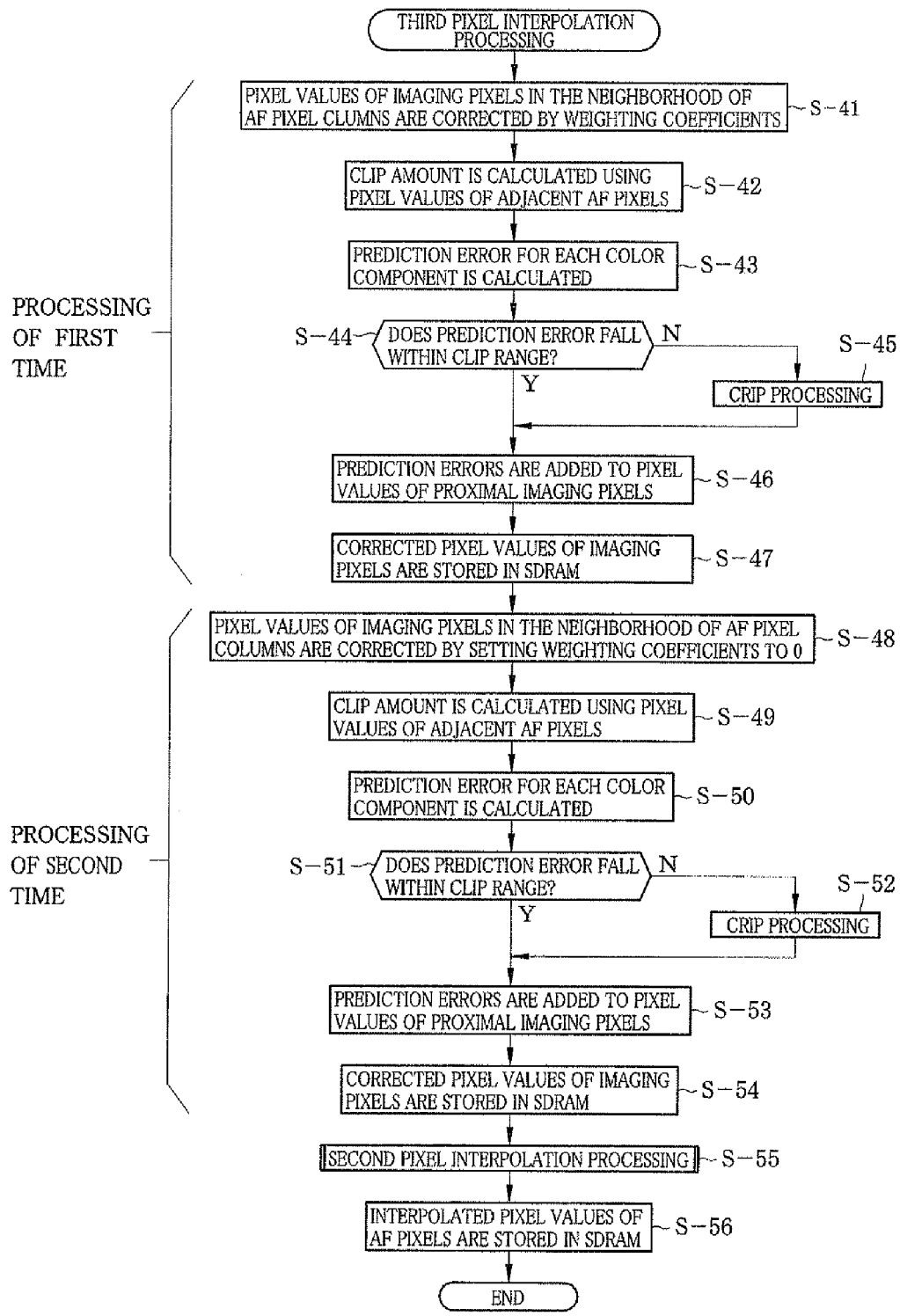

FLARE DETERMINATION APPARATUS, IMAGE PROCESSING APPARATUS, AND STORAGE MEDIUM STORING FLARE DETERMINATION PROGRAM

CROSS-REFERENCE TO RELATED APPLICATIONS

This application is based upon and claims the benefit of priorities from Japanese Patent Application No. 2011-145705, filed on Jun. 30, 2011 and U.S. Provisional Patent Application No. 61/604,694, filed on Feb. 29, 2012, the entire contents of which are incorporated herein by reference.

BACKGROUND

1. Field

The present application relates to a flare determination apparatus, an image processing apparatus, and a storage medium storing a flare determination program.

2. Description of the Related Art

Conventionally, an imaging element in which a plurality of pixels for focus detection are arranged on a part of a light-receiving surface on which a plurality of imaging pixels are two-dimensionally arranged, has been known (refer to Japanese Unexamined Patent Application Publication No. 2009-303194). The plurality of imaging pixels have spectral characteristics corresponding to respective plural color components, and further, the pixels for focus detection (focus detecting pixels) have spectral characteristics which are different from the spectral characteristics of the plurality of imaging pixels. From the plurality of imaging pixels, signals for generating an image are read to determine pixel values of the imaging pixels, and further, from the focus detecting pixels, signals for focus detection are read to determine pixel values of the focus detecting pixels. When performing pixel interpolation, a pixel value of a missing color component out of pixel values of the imaging pixels is interpolated, and an imaging pixel value corresponding to a position of the focus detecting pixel is interpolated.

In the invention described in Japanese Unexamined Patent Application Publication No. 2009-303194, in order to perform interpolation processing with respect to a focus detecting pixel, an interpolation pixel value of the focus detecting pixel is generated by using pixel values of imaging pixels positioned in a neighborhood of the focus detecting pixel, an evaluation pixel value being a pixel value when the neighboring imaging pixel has the same spectral characteristics as those of the focus detecting pixel is calculated, a high frequency component of image is calculated by using a pixel value of the focus detecting pixel and the evaluation pixel value, and the high frequency component is added to the interpolation pixel value to calculate a pixel value of imaging pixel corresponding to a position of the focus detecting pixel.

Generally, in an image processing apparatus, when flare is generated between pixels in the periphery of a light receiving part in an imaging element by reflected light from a wiring region, color mixing is caused by crosstalk in which incident light between micro-lenses leaks into neighboring pixels in the periphery of the light receiving part. When such a phenomenon occurs, not only the focus detecting pixel but also pixels therearound is affected and the focus detecting pixel having received the color mixing by the above-described pixel interpolation and pixels therearound appear as an interpolation residual which provides uncomfortable feeling to a human eye. When the occurrence of this flare can be preliminarily detected, it becomes possible to perform the above-described processing related to the pixel interpolation appropriately, but there is a problem in which a color component range of the color mixing caused by the flare is different depending on a light source type and it is difficult to detect the flare appropriately.

SUMMARY

The present application has been made in view of such a point, and the proposition is to provide a flare determination apparatus, an image processing apparatus, and a storage medium storing a flare determination program, which make it possible to appropriately detect flare to be generated even when a light source type is different at the time of photographing.

An aspect of a flare determination apparatus illustrating the present embodiment includes an image input unit inputting an image, an image correction unit correcting the image using a correction coefficient to be set based on a gain value for white balance processing depending on a light source type, a region detection unit detecting a region included in a predetermined color component range from the image being corrected by the image correction unit, and a determination unit determining whether or not a flare is generated in the region being detected by the region detection unit.

In addition, the aspect of a flare determination apparatus further includes a matrix determination unit obtaining a second color space conversion matrix by correcting a first color space conversion matrix to be used when converting a color apace of the image being input by the image input unit using the correction coefficient to be set based on the gain value for the white balance processing depending on the light source type, in which the image correction unit converts the color space of the image using the second color space conversion matrix and the region detection unit detects the region included in the predetermined color component range from the image being converted the color space.

Furthermore, the second color space conversion matrix converts pixel values of pixels included in a region where color mixing caused by the flare is generated into pixel values included in the predetermined color component range.

Moreover, the aspect of a flare determination apparatus further includes a high intensity region extraction unit extracting a region of pixels each having an intensity value exceeding a threshold value set in advance among pixels included in the image, in which the region detection unit executes color space conversion using the second color space conversion matrix on the region being extracted by the high intensity region extraction unit.

In this case, it is preferable to provide a threshold calculation unit obtaining the threshold value based on a histogram generated by using each intensity value of the pixels included in the image.

Furthermore, the high intensity region extraction unit extracts a region of pixels exceeding the threshold value among pixels which are included in the image and having the intensity value not saturated.

In addition, the region detection unit detects a region included in the predetermined color component range from a region excluding pixels which are included in the image and having unsaturated pixel values.

Moreover, preferably, the determination unit determines whether or not the flare is generated in the region using evaluation values including at least two of a total area of the region included in the predetermined color component range, a space dispersion value/the total area of the region, and an average value of an edge amount of an intensity component.

Furthermore, preferably, the determination unit determines whether or not the flare is generated in the region using evaluation values including a total area of the region included in the predetermined color component range, a space dispersion value/the total area of the region, and an average value of an edge amount of an intensity component.

In addition, preferably, the predetermined color component range is a color component range being magenta.

Moreover, a flare determination apparatus of the present embodiment includes an image input unit inputting an image, an image correction unit correcting the image using a correction coefficient to be set based on a gain value for white balance processing depending on a light source type, a region detection unit detecting a region included in a predetermined color component range from the image being corrected by the image correction unit, and an evaluation value determination unit determining whether or not a flare is generated by determining a plurality of kinds of evaluation values to be obtained from information regarding the region being detected by the region detection unit.

Furthermore, an image processing apparatus of the present embodiment includes the above-described flare determination apparatus, an imaging element receiving object light and outputting an image signal for forming the image, and an image processing unit performing image processing including the white balance processing on the image signal.

Here, preferably, the image to be input into the flare determination apparatus includes an evaluation image to be used when setting the gain value in the white balance processing.

In addition, the imaging element includes imaging pixels and focus detecting pixels, and preferably the image processing apparatus further includes an interpolation processing unit executing interpolation processing based on the determination result in the flare determination apparatus on pixel values of the imaging pixels and pixel values of the focus detecting pixels.

Moreover, a storage medium of the present embodiment is a computer readable storage medium which stores a flare determination program capable of causing a computer to execute an image input step inputting an image, an image correction step correcting the image using a correction coefficient to be set based on a gain value for white balance processing depending on a light source type, a region detection step detecting a region included in a predetermined color component range from the image being corrected by the image correction step, and a determination step determining whether or not a flare is generated in the region being detected by the region detection step.

BRIEF DESCRIPTION OF THE DRAWINGS

FIG. 3 is a diagram illustrating a part of image data in which an area in which the AF pixels are arranged is set as a center.

FIG. 14 is a flow chart illustrating a flow of third pixel interpolation processing.

DETAILED DESCRIPTION OF THE EMBODIMENT

Figure 1:
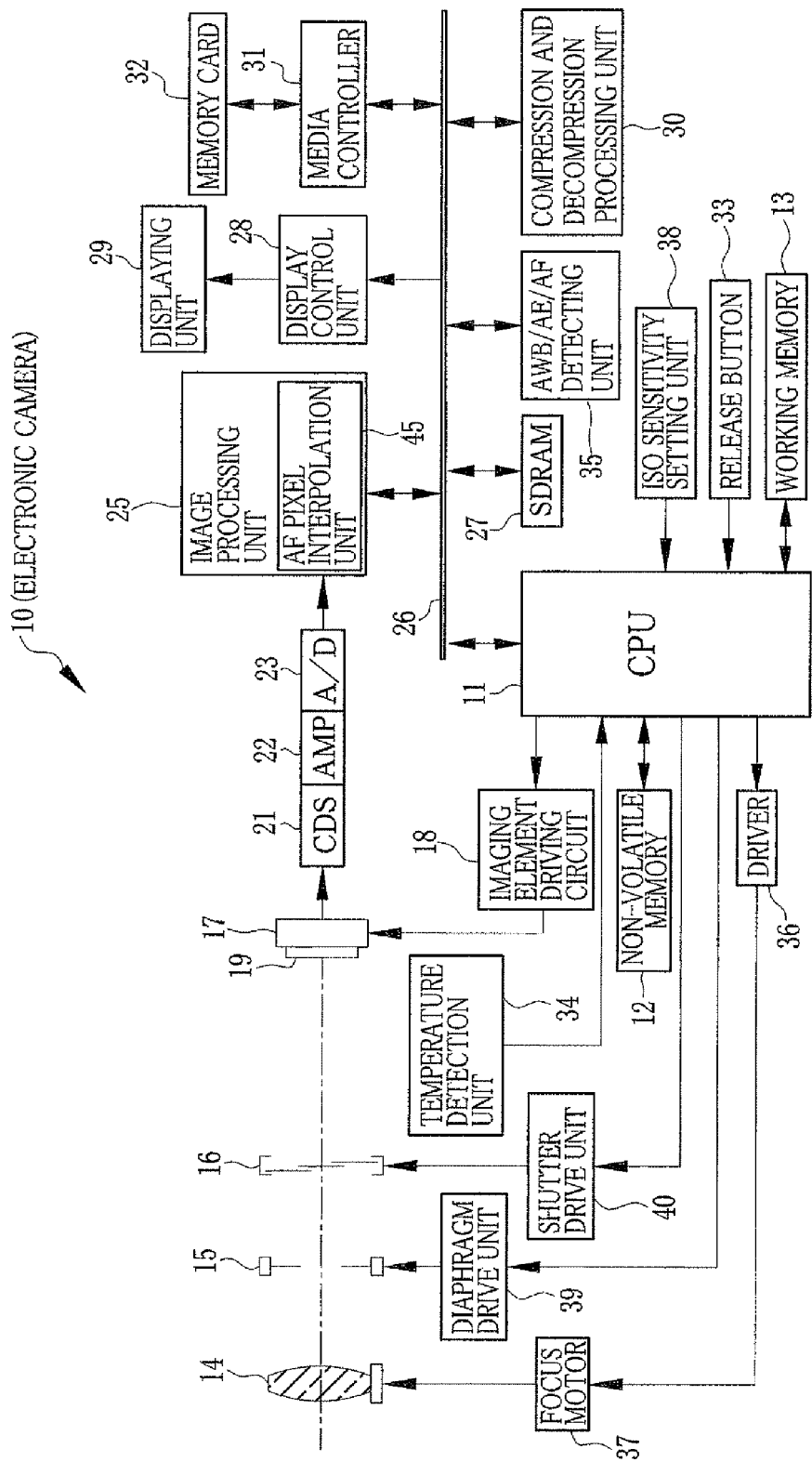
FIG. 1 is a functional block diagram illustrating an electrical configuration of an electronic camera.

As illustrated in FIG. 1, an electronic camera 10 to which the present invention is applied includes a CPU 11. To the CPU 11, a non-volatile memory 12, and a working memory 13 are connected, and the non-volatile memory 12 stores a control program which is referred to when the CPU 11 performs various controls, and so on. In addition, the non-volatile memory 12 stores data indicating position coordinates of AF pixels of an imaging element 17, previously determined data of various threshold values, weighted coefficients and so on used for an image processing program, various determination tables and the like, which will be described later in detail.

The CPU 11 performs, in accordance with a control program stored in the non-volatile memory 12, control of respective units by utilizing the working memory 13 as a temporary storage working area, to thereby activate respective units (circuits) that form the electronic camera 10.

A subject light incident from a photographic lens 14 is image-formed on a light-receiving surface of the imaging element 17 such as a CCD and a CMOS via a diaphragm 15 and a shutter 16. An imaging element driving circuit 18 drives the imaging element 17 based on a control signal from the CPU 11. The imaging element 17 is a Bayer pattern type single-plate imaging element, and to a front surface thereof, primary color transmission filters 19 are attached.

The primary color transmission filters 19 are arranged in a primary color Bayer pattern in which, with respect to a total number of pixels N of the imaging element 17, a resolution of G (green) becomes N/2, and a resolution of each of R (red) and B (blue) becomes N/4, for example.

A subject image formed on the light-receiving surface of the imaging element 17 is converted into an analog image signal. The image signal is output to a CDS 21 and an AMP 22, in this order, that form an AFE (Analog Front End) circuit, in which the signal is subjected to predetermined analog processing in the AFE circuit, and then the resultant is converted into digital image data in an A/D (Analog/Digital converter) 23 to be transmitted to an image processing unit 25.

The image processing unit 25 includes a separation circuit, a white balance processing circuit, a pixel interpolation (demosaicing) circuit, a matrixing circuit, a nonlinear conversion (γ correction) processing circuit, an edge enhancement processing circuit and the like, and performs white balance processing, pixel interpolation processing, matrixing, nonlinear conversion (γ correction) processing, edge enhancement processing and the like on the digital image data. The separation circuit separates a signal output from an imaging pixel and a signal output from a focus detecting pixel, which will be described later in detail. The pixel interpolation circuit converts a Bayer pattern signal in which one pixel is formed of one color into a normal color image signal in which one pixel is formed of three colors.

The image data with three colors output from the image processing unit 25 is stored in an SDRAM 27 via a bus 26. The image data stored in the SDRAM 27 is read through a control of the CPU 11 to be transmitted to a display control unit 28. The display control unit 28 converts the input image data into a signal in a predetermined format for display (a color complex video signal in an NTSC format, for example), and outputs the resultant to a displaying unit 29 as a through image.

Further, image data obtained in response to a shutter release is read from the SDRAM 27 and then transmitted to a compression and decompression processing unit 30 in which compression processing is performed, and the resultant is recorded in a memory card 32 being a recording medium via a media controller 31.

To the CPU 11, a release button 33 and a power switch (not illustrated) are connected, and temperature information is input from a temperature detection unit 34 that detects a temperature of the imaging element 17. The information is transmitted to the image processing unit 25, and is utilized when determining a noise, which will be described later in detail.

An AWB/AE/AF detecting unit 35 detects, based on a signal of focus detecting pixel (AF pixel), a defocus amount, and a direction of defocus using a pupil division type phase difference detection method. The CPU 11 controls a driver 36 based on the defocus amount, and the direction of defocus obtained by the AWB/AE/AF detecting unit 35 to drive a focus motor 37, thereby making a focus lens move forward/backward in an optical axis direction to perform focusing.

Further, the AWB/AE/AF detecting unit 35 calculates, from a photometric brightness value (Bv) calculated based on a signal of imaging pixel, and an ISO sensitivity value (Sv) set by a person who performs photographing in an ISO sensitivity setting unit 38, a light value (Lv=Sv+Bv). Further, the AWB/AE/AF detecting unit 35 decides a diaphragm value and a shutter speed so that an exposure value (Ev=Av+Tv) becomes the determined light value Lv. Based on the decision, the CPU 11 drives a diaphragm drive unit 39 to adjust a diaphragm diameter of the diaphragm 15 so that the diaphragm has the determined diaphragm value. In conjunction with that, the CPU 11 drives a shutter drive unit 40 to execute an opening/closing operation of the shutter 16 so that the shutter 16 is opened at the determined shutter speed.

The AWB/AE/AF detecting unit 35 performs a thinning-out reading from the image data of one screen captured in the SDRAM 27, at the time of performing auto white balance adjustment, and generates AWB evaluation data of 24×16, for example. Further, the AWB/AE/AF detecting unit 35 performs light source type determination using the generated AWB evaluation data, and performs correction on a signal of each color channel in accordance with a white balance adjustment value suitable for the determined light source type.

As the imaging element 17, a semiconductor image sensor of CCD or CMOS in which the primary color transmission filter 19 of any one of R (red), G (green), and B (blue) is arranged, in a Bayer pattern, on each of a plurality of imaging pixels which are provided on a light-receiving surface of the semiconductor image sensor, and a microlens array is provided on the filter, or the like is appropriately selected to be used. Further, the imaging element 17 of the present embodiment has a plurality of AF pixels 41 one-dimensionally arranged in a horizontal scanning direction, on a part of area on the light-receiving surface. On those AF pixels 41, the primary color transmission filters 19 are not disposed. Further, there are two types of AF pixels 41, which are, one that receives light of luminous flux that passes through a left side of a pupil of an optical system of the photographic lens 14, and one that receives light of luminous flux that passes through a right side of the pupil of the optical system of the photographic lens 14. The imaging element 17 can individually read pixel signals from the imaging pixel group, and the AF pixel group.

Figure 2:
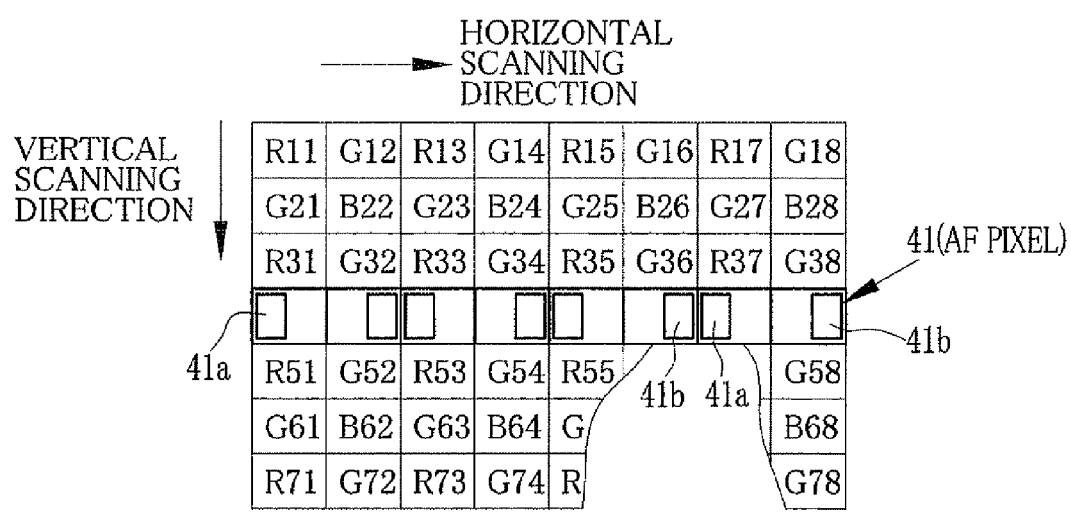
FIG. 2 is a diagram illustrating an example of arrangement of imaging pixels and AF pixels.

As illustrated in FIG. 2, the AF pixels 41 have sensor openings 41a, 41b each deviated to one side with respect to a cell center (center of microlens), and are one-dimensionally arranged along a direction of the deviation. The sensor openings 41a, 41b have a mutually opposite direction of deviation, and a distance of the deviation is the same. The AF pixel 41 having the sensor opening 41a is disposed instead of a G pixel in an RGB primary color Bayer pattern, and further, the AF pixel 41 having the sensor opening 41b is disposed instead of a B pixel in the RGB primary color Bayer pattern. A pupil division phase difference AF method is realized by the AF pixels 41 having such sensor openings 41a, 41b. Specifically, if lights of two partial luminous fluxes existed at positions symmetric with respect to an optical axis of the photographic lens 14, among luminous fluxes passing through an exit pupil, are respectively received by the AF pixel 41 having the sensor opening 41a and the AF pixel 41 having the sensor opening 41b, a direction of focus deviation (moving direction of focusing lens), and an amount of focus deviation (movement amount of focusing lens) can be determined from a phase difference of signals output from the two pixels 41. This enables to perform speedy focusing.

Therefore, each of the AF pixels 41 in the present embodiment outputs a pupil-divided detection signal of the left side or the right side in accordance with a brightness of white light. FIG. 3 illustrates a part of image data in which an area in which the AF pixels 41 are arranged is set as a center, out of the image data imaged by the imaging element 17. Each cell represents one pixel. Symbols R, G and B at the head of respective cells indicate the imaging pixels having respective primary color transmission filters 19. Meanwhile, each of symbols X and Y indicates the AF pixel having sensitivity to the luminous flux from the left side or the right side, and those AF pixels are alternately arranged one-dimensionally in the horizontal scanning direction. A two-digit number subsequent to each of these symbols indicates a pixel position.

The pixel interpolation unit includes an AF pixel interpolation unit 45 interpolating pixel values of the AF pixels 41 by using pixel values of the imaging pixels, and a pixel interpolation unit performing color interpolation based on a linear interpolation method from the Bayer pattern into RGB after interpolating the pixel values of the AF pixels.

Figure 4:
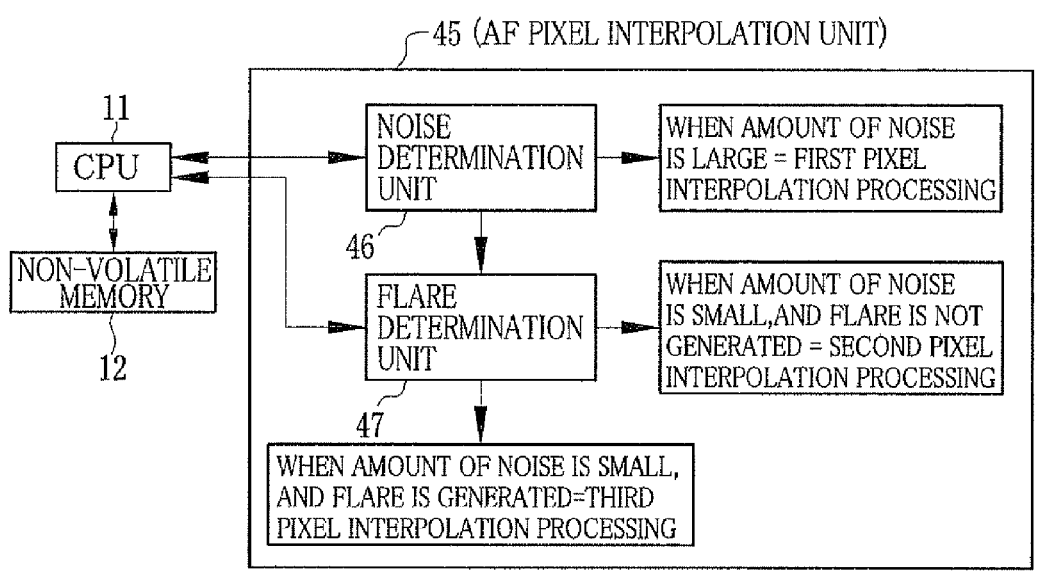
FIG. 4 is a diagram illustrating an AF pixel interpolation unit provided with a noise determination unit and a flare determination unit.

As illustrated in FIG. 4, the AF pixel interpolation unit 45 includes a noise determination unit 46, and a flare determination unit 47, and performs different AF pixel interpolation processings based on a determination given by these determination units. The noise determination unit 46 determines whether there is provided a condition in which a large amount of noise is generated, based on photographing conditions at the time of performing photographing. The photographing conditions include a temperature of the imaging element 17, an ISO sensitivity, a shutter speed and the like. Temperature information of the imaging element 17 is obtained from the CPU 11. Further, information regarding the ISO sensitivity and the shutter speed set at the time of performing photographing, is also obtained from the CPU 11 together with the temperature information.

The noise determination unit 46 determines whether the amount of noise is large or small, based on the information regarding the temperature of the imaging element 17, the ISO sensitivity, and the shutter speed. Note that it is also possible to design such that a temperature detection unit is provided on a main board on which the imaging element 17 is mounted, and a temperature of the main board, or a temperature surrounding the imaging element 17 is used instead of the temperature of the imaging element 17. Besides, the information used for the noise determination is not limited to the three pieces of information regarding the temperature of the imaging element 17, the ISO sensitivity and the shutter speed, and the information may be any one of or two pieces of the three pieces of information described above.

When the noise determination unit 46 determines that the amount of noise is large, a pixel value of the AF pixel is not used, and first pixel interpolation processing in which, for example, simple average interpolation is performed by using pixel values of imaging pixels in the neighborhood of the AF pixel, is conducted. When it is determined that the amount of noise is small, the flare determination is performed in the flare determination unit 47, and in accordance with whether or not the flare is generated, second or third pixel interpolation processing different from the first pixel interpolation processing is conducted.

The flare determination unit 47 is provided with a histogram generation unit 51, a threshold calculation unit 52, a target region extraction unit 53, a matrix determination unit 54, a magenta region determination unit 55 and an evaluation value determination unit 56. This flare determination unit 47 acquires a white balance gain value from the CPU 11 other than the AWB evaluation data (YRGB data). It should be noted that YRGB data of 24×16 pixels is used as this AWB evaluation data.

Figure 5:
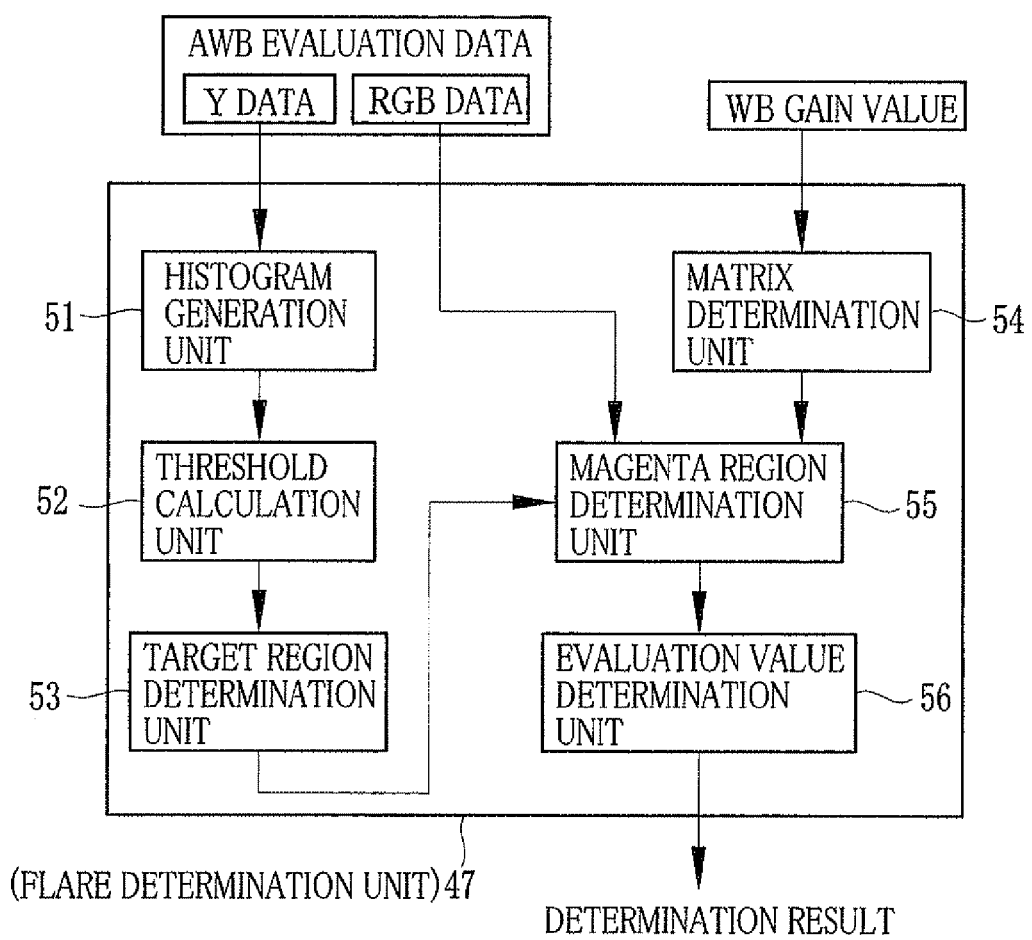
FIG. 5 is a diagram illustrating a flare determination unit.

As shown in FIG. 5, the histogram generation unit 51 generates a histogram using Y data in the AWB evaluation data. The threshold calculation unit 52 calculates a threshold value (high brightness determination threshold value) used for extracting a region having a high brightness (high brightness region) from the histogram generated by the histogram generation unit 51. The target region extraction unit 53 extracts a rectangular region having a high brightness as a target region using the Y data and the high brightness determination threshold value. The matrix determination unit 54 determines a matrix to be used when RGB data of the AWS evaluation data is converted into CrCb data. The magenta region determination unit 55 detects a region (magenta region) which has magenta and is included in the target region extracted by the target region extraction unit 53. In this detection, the magenta region detection unit 55 calculates a total area of the magenta region, a total edge amount of a Y component, and the like. The evaluation value determination unit 56 obtains the total area of the magenta region, a dispersion value/the total area of the magenta region, an average edge amount of the Y component, and determines whether the flare is generated or not by performing threshold value determination on each of the obtained values.

When it is determined that the flare is not generated, the AF pixel interpolation unit 45 executes the second pixel interpolation processing in which a pixel value of AF pixel is interpolated by using a pixel value of the AF pixel and pixel values of imaging pixels. In the second pixel interpolation processing, the pixel value of the AF pixel is interpolated by estimating the pixel value from the pixel value (white (W) component) of the AF pixel based on the pixel values of the imaging pixels through a weighted sum.

When it is determined that the flare is generated, the AF pixel interpolation unit 45 executes the third pixel interpolation processing. The third pixel interpolation processing executes a plural times (two times in the present embodiment) of processing in which the pixel values of the imaging pixels in the neighborhood of the AF pixel are corrected by weighting coefficients, and the corrected pixel values of the imaging pixels are smoothed. Although details will be described later, when the correction of the second time is performed, the weighting coefficients are set to "0". Specifically, in the processing of the second time, the processing of correcting the pixel values of the imaging pixels in the neighborhood of the AF pixel using the weighting coefficients is not conducted, and only the processing of smoothing the pixel values of the imaging pixels is executed. After the plural times of processing, the second pixel interpolation processing in which the pixel value of the AF pixel is interpolated by estimating the pixel value from the pixel value (white (W) component) of the AF pixel based on the corrected pixel values of the imaging pixels through the weighted sum, is executed. Accordingly, it is possible to suppress an influence of color mixture in the flare with respect to the imaging pixels in the neighborhood of the AF pixel. Therefore, at the time of conducting the second pixel interpolation processing, the influence of color mixture is also suppressed in the pixel value obtained as a result of generating the AF pixel as the imaging pixel.

Figure 6:
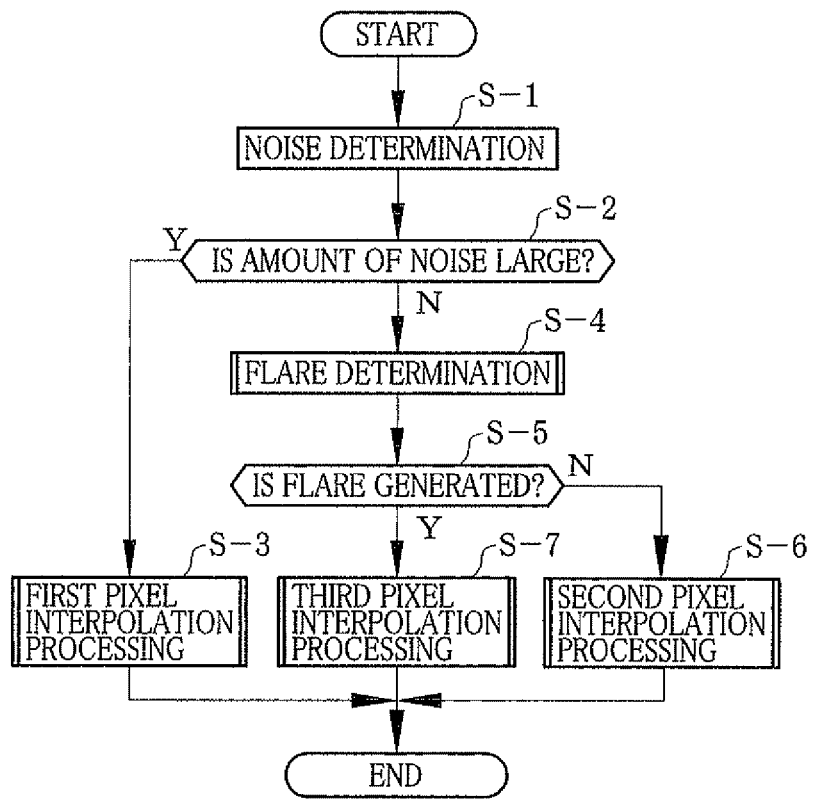
FIG. 6 is a flowchart illustrating the operation of an AF pixel interpolation unit.

Next, an operation of the AF pixel interpolation unit 45 will be described with reference to FIG. 6. Note that in the present embodiment, since the primary color transmission filters 19 disposed on the respective imaging pixels are arranged in the Bayer pattern, a pixel value of imaging pixel of green color (G) is interpolated at a position of AF pixel represented by the symbol X, and a pixel value of imaging pixel of blue color (B) is interpolated at a pixel position of AF pixel represented by the symbol Y illustrated in FIG. 3. In the explanation hereinafter, a case where a pixel value of imaging pixel of blue color at Y44 and a pixel value of imaging pixel of green color at X45 are respectively interpolated, will be described. A procedure of interpolating a pixel value of imaging pixel in another AF pixel is also similarly conducted.

(Noise Determination)

The CPU 11 transmits the image data transmitted from the A/D 23 to the noise determination unit 46. Further, the CPU 11 transmits the information regarding the temperature of the imaging element 17 at the time of performing photographing, the ISO sensitivity, and the shutter speed to the noise determination unit 46. In this manner, the CPU 11 controls the noise determination unit 46, and determines, with the noise determination unit 46, whether the amount of noise is large or small with respect to the image data (S-1).

The determination of the noise determination unit 46 is executed by referring to noise determination tables. The plurality of noise determination tables are prepared for each temperature range of the imaging element 17, and these tables are previously stored in the non-volatile memory 12. The CPU 11 transmits the noise determination table corresponding to the temperature of the imaging element 17 at the time of obtaining the image data to the noise determination unit 46.

As the noise determination table, a table described in [Table 1] is selected when the temperature of the imaging element 17 is less than T1, and a table described in [Table 2]

is selected when the temperature is in a range of T1 or more and less than T2, for example. In each table, estimation results of noise determined by the shutter speed (P) and the ISO sensitivity (Q) are determined based on previously conducted experiments.

TABLE 1

TEMPERATURE OF IMAGING ELEMENT < T1 SHUTTER SPEED P

|  |  | $P_1$ | $P_2$ | $P_3$ | $P_4$ | ... | $P_n$ |
|---|---|---|---|---|---|---|---|
| ISO SENSITIVITY Q | $Q_1$ | X | X | X | X | ... | ○ |
|  | $Q_2$ | X | X | X | X |  | ○ |
|  | $Q_3$ | X | X | X | ○ |  | ○ |
|  | ⋮ |  |  |  |  |  |  |
|  | $Q_{m-1}$ | ○ | ○ | ○ | ○ |  | ○ |
|  | $Q_m$ | ○ | ○ | ○ | ○ | ... | ○ |

○: AMOUNT OF NOISE IS SMALL
X: AMOUNT OF NOISE IS LARGE

TABLE 2

T1 ≤ TEMPERATURE OF IMAGING ELEMENT < T2 SHUTTER SPEED P

|  |  | $P_1$ | $P_2$ | $P_3$ | $P_4$ | ... | $P_n$ |
|---|---|---|---|---|---|---|---|
| ISO SENSITIVITY Q | $Q_1$ | X | X | X | X | ... | ○ |
|  | $Q_2$ | X | X | X | X |  | ○ |
|  | $Q_3$ | X | X | X | X |  | ○ |
|  | ⋮ |  |  |  |  |  |  |
|  | $Q_{m-1}$ | X | ○ | ○ | ○ |  | ○ |
|  | $Q_m$ | ○ | ○ | ○ | ○ | ... | ○ |

○: AMOUNT OF NOISE IS SMALL
X: AMOUNT OF NOISE IS LARGE

When it is determined that the amount of noise is large (Yes in S-2), the pixel value of the AF pixel is not used, and the first pixel interpolation processing is conducted by using the pixel values of the imaging pixels in the neighborhood of the AF pixel (S-3).

(Flare Determination)

When the noise determination unit 46 determines that noise is not caused frequently (No in S-2), the CPU 11 controls the flare determination unit 47 and the flare determination unit 47 determines whether flare is generated or not (S-4).

The AF pixel interpolation unit 45 executes, in a alternative way, the second pixel interpolation processing (S-6) when the flare determination unit 47 determines that the flare is not generated (No in S-5), or the third pixel interpolation processing (S-7) when the flare determination unit 47 determines that the flare is generated (Yes in S-5). It should be noted that the first pixel interpolation processing, the second pixel interpolation processing, and the third pixel interpolation processing, which are carried out according to these determinations, will be described later.

Figure 7:
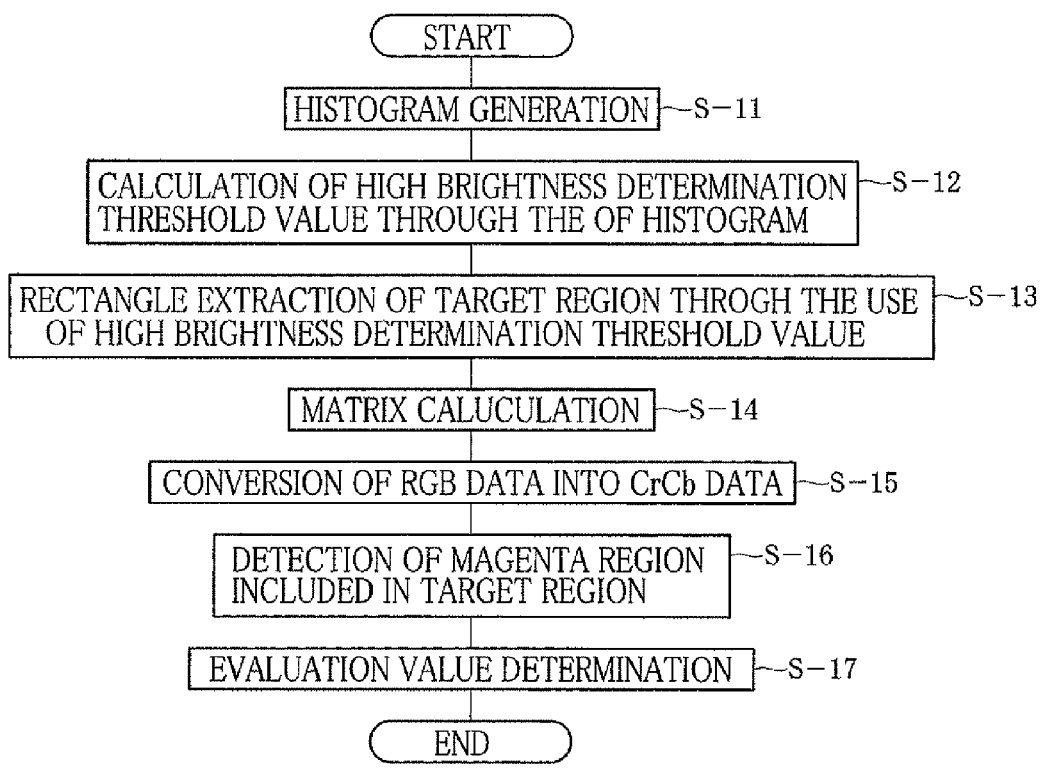
FIG. 7 is a flowchart illustrating the operation of a flare determination unit.

In the following, the flare determination will be explained according to a flowchart in FIG. 7.

(Histogram Generation)

Figure 8A:
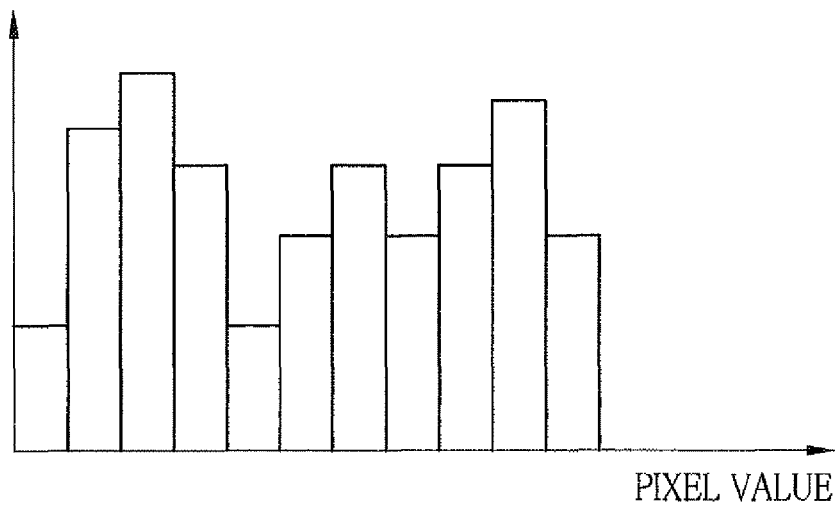
FIG. 8A is a diagram illustrating a histogram obtained from AWB evaluation data.

The AF pixel interpolation unit 45 generates a histogram using the Y data of the AWB evaluation data output from the CPU 11 (S-11). Here, when the Y data is 16 bit data, the AF pixel interpolation unit 45 converts the Y data from 16 bits into 8 bits and generates the histogram. FIG. 8A shows an example of the histogram using the Y data.

(Calculation of a High Brightness Determination Threshold Value Using the Histogram)

Figure 8B:
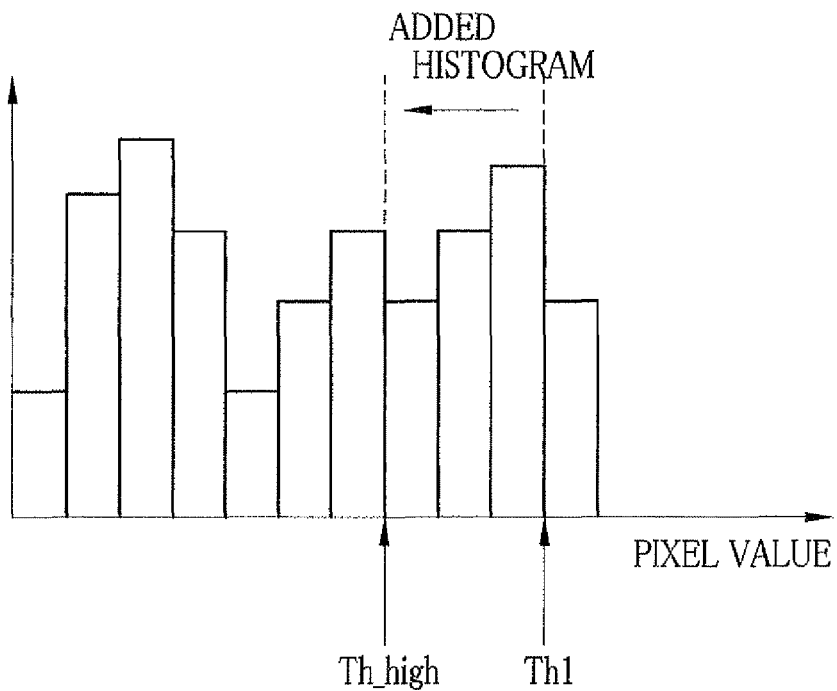
FIG. 8B is a diagram illustrating a relationship between the obtained histogram and a threshold value to be used when extracting a high intensity pixel.

The AF pixel interpolation unit 45 calculates a threshold value (high brightness determination threshold value) Th_high which is used for extracting a region (target region) to be used for detecting a to-be-described magenta region, using the generated histogram (S-12). The AF pixel interpolation unit 45, as shown in FIG. 8B, specifies the unsaturated pixel values using the Y data and a threshold value (saturation determination threshold value) Th1 determining whether the pixel value is saturated or not. This saturation determination threshold value Th1 is preferably provided as 8 bit data since the histogram is generated as 8 bit data, but, when 16 bit data is used, a value converted into 8 bit data may be used.

After this specification, the AF pixel interpolation unit 45 adds values each obtained by multiplication of a pixel value equal to or lower than the threshold value Th1 and the number of pixels there, in order from a higher pixel value. Then, in the process of the addition, a pixel value when [Mathematical expression 1] is satisfied is set the high brightness determination threshold value Th_high.

$$\text{additional value of histgram(pixel value} \times \text{number of pixels)} > (256 - Th2) \times \text{total number of pixels} \quad \text{[Mathematical expression 1]}$$

Here, Th2 is a threshold value showing a ratio of high brightness components. Further, the total number of pixels is 24×16 (=384) pixels since the Y data of 24×16 pixels is used.

The AF pixel interpolation unit 45 converts the calculated high brightness determination threshold value Th_high from 8 bit data, into 16 bit data.

(Rectangle Extraction of the Region (Target Region) to be Used for Detecting the Magenta Region Using the High Brightness Determination Threshold Value)

Figure 9:
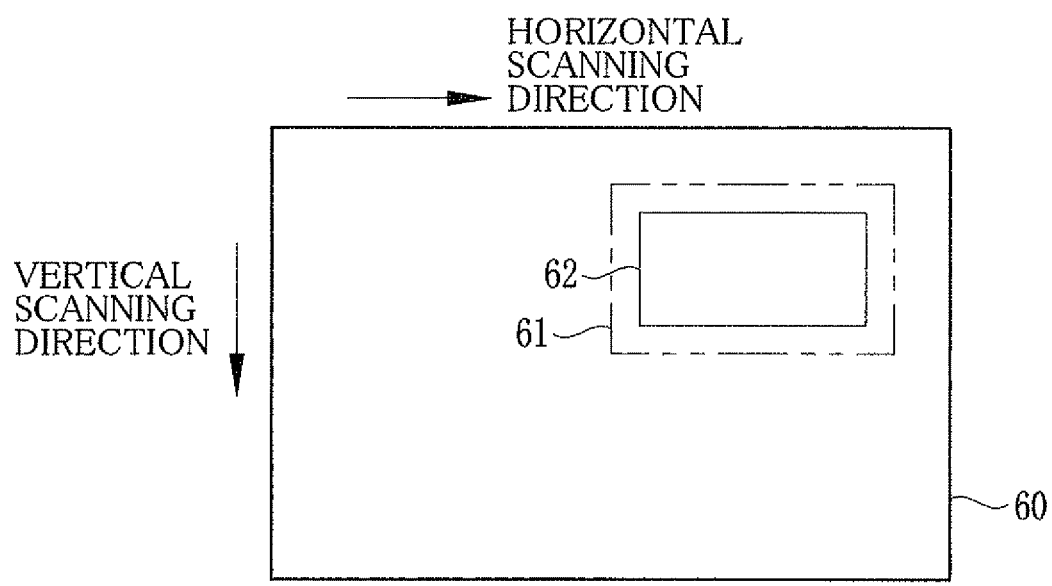
FIG. 9 is a diagram illustrating a relationship between a Y image based on Y dada and a target region to be extracted in a rectangle.

The AF pixel interpolation unit 45 performs rectangle extraction of the target region by using the high brightness determination threshold value Th_high which has been converted into 16 bit data and the AWB evaluation Y data (S-13). The AF pixel interpolation unit 45, as shown in FIG. 9, shifts each pixel of an image (Y image) 60 based on the Y data by one pixel in the horizontal scanning direction and detects a pixel where both of the pixel value of the target pixel and the pixel value of the pixel one pixel previous to the target pixel become pixel values equal to or higher than the high brightness determination threshold value Th_high. The AF pixel interpolation unit 45, when having finished the processing for one line in the horizontal scanning direction, shifts the pixels by one pixel in the vertical scanning direction and performs the same processing. Thereby, the AF pixel interpolation unit 45 detects a pixel where both of the pixel value of the target pixel and the pixel value of the pixel one pixel previous to the target pixel become pixel values equal to or higher than the high brightness determination threshold value Th_high, for all the Y data pixels. In FIG. 9, the region indicated by sign 61 is a pixel region to be detected. The AF pixel interpolation unit 45 extracts a rectangular region smaller by one pixel (sign 62) as the target region in the detected region (sign 61). This prevents, if the detected pixel region is extracted as the target region as it is, a pixel value of a low brightness pixel from being used, when there is obtained a total difference sum of the edge amounts for the Y components in the neighboring four directions as described later. The AF pixel interpolation unit 45 generates positional data of pixels located at the four corners of the extracted target region, as positional information of the target region obtained by the rectangle extraction.

Here, while the AF pixel interpolation unit 45 performs the above-described processing on all the Y data pixels, not necessarily limited to this case, the above-described processing can be carried out also for pixels having a brightness value lower than the above-described saturation determination threshold value Th1.

(Matrix Calculation)

The AF pixel interpolation unit 45 calculates a matrix to be used when the RGB data of the AWB evaluation data is converted into the CrCb data (S-14).

It is known that the color mixing caused by the flare generated in imaging appears as magenta color in an image. One reason why this magenta color appears is that, when R, G, and B gain values to be used for white balance processing are multiplied to color pixel values of the pixels, respectively, the values of the R color component and the B component become larger than the value of the G color component.

Here, when the same object is photographed by different light source type, the R, G, and B gain values are used according to the light source type in the white balance processing. Thereby, even when a mono-color object is photographed, the output value changes considerably depending on the light source type. Because of this output value variation, it is difficult to detect the flare reliably.

Accordingly, the present invention multiplies the color space conversion matrix to be used when the RGB data is converted into the CrCb data by a matrix of correction coefficients which is obtained through the utilization of the gain values to be used in the white balance processing, and calculates a new color space conversion matrix. Then, the RGB data is converted into the CrCb data through the use of the newly calculated color space conversion matrix.

Here, a new gain value for the R color component is expressed by [Mathematical expression 2] when the gain value is set from the R gain value for the white balance and a reference value (512×2) by weighted sum using a weighting coefficient.

$$\alpha_R = a \times Rgain + (1-a) \times 512 \times 2 \qquad \text{[Mathematical expression 2]}$$

The reference value (512×2) is a value to be set in consideration of a fact that the value of Rgain is approximately two times of the value of Ggain even when the light source type is changed.

Figure 10:
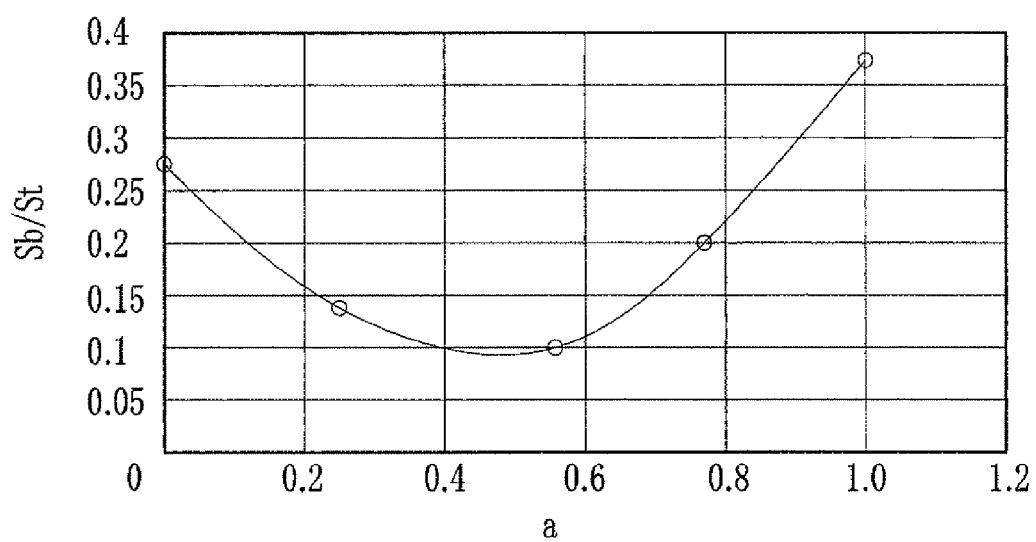
FIG. 10 is a graph illustrating a relationship between a variable a and a Sb/St value.

Here, there are considered Sb/St values obtained when the value of a is changed in photographing under a clear sky and indoor photographing, respectively. Sb indicates a dispersion between classes (photographing under a clear sky and indoor photographing) and St indicates a dispersion among all the samples. It should be noted that a smaller Sb/St value shows that a distance between the classes (photographing under a clear sky and indoor photographing) is smaller and output value variation between the different light sources is smaller. Here, as shown in FIG. 10, it is found that the Sb/St value becomes smallest in the case of a=0.5 when a is varied.

By this consideration, when LSB=512 is assumed for each signal value of the R color component, G color component, and the B color component, the corrected R gain value $\alpha_R$, G gain value $\alpha_G$ and B gain value $\alpha_B$ are expressed by [Mathematical expression 3]. Here, each of Rgain, Ggain, and Bgain is a gain value of each color component for the white balance processing.

$$\alpha_R = 0.5 \times Rgain + 512$$

$$\alpha_G = Ggain = 512$$

$$\alpha_B = 0.5 Bgain + 512 \qquad \text{[Mathematical expression 3]}$$

Further, when LSB=256 is assumed for each signal value of the R color component and the B color component and LSB=512 is assumed for a signal value of the G color component, the corrected R gain value $\alpha_R$, G gain value $\alpha_G$, and B gain value $\alpha_B$ are given by [Mathematical expression 4].

$$\alpha_R = Rgain + 512$$

$$\alpha_G = Ggain = 512$$

$$\alpha_B = Bgain + 512 \qquad \text{[Mathematical expression 4]}$$

The RGB data is converted into the CrCb data through the use of these $\alpha_R$, $\alpha_G$, and $\alpha_B$. Here, generally the RGB to YCrCb conversion is expressed by [Mathematical expression 5].

$$\begin{bmatrix} Y \\ Cr \\ Cb \end{bmatrix} = \begin{bmatrix} 0.299 & 0.587 & 0.110 \\ 0.500 & -0.419 & -0.081 \\ -0.169 & -0.331 & 0.500 \end{bmatrix} \times \begin{bmatrix} R \\ G \\ B \end{bmatrix} \qquad \text{[Mathematical expression 5]}$$

As described above, the present invention performs multiplication of the corrected R gain value $\alpha_R$, G gain value $\alpha_G$, and B gain value $\alpha_B$ in the color space conversion. Then, a formula to be used in the color space conversion from RGB to CrCb is given by [Mathematical expression 6].

$$\begin{bmatrix} Cr \\ Cb \end{bmatrix} = \begin{bmatrix} 0.299 & 0.587 & 0.110 \\ 0.500 & -0.419 & -0.081 \\ -0.169 & -0.331 & 0.500 \end{bmatrix} \times$$

$$\begin{bmatrix} \alpha_R & 0 & 0 \\ 0 & \alpha_G & 0 \\ 0 & 0 & \alpha_B \end{bmatrix} \times \begin{bmatrix} R \\ G \\ B \end{bmatrix}$$

$$= C \times \begin{bmatrix} R \\ G \\ B \end{bmatrix} \qquad \text{[Mathematical expression 6]}$$

That is, a matrix C to be used in the conversion of RGB data into CrCb is given by [Mathematical expression 7] from [Mathematical expression 5] and [Mathematical expression 6].

$$C = \begin{bmatrix} C_{00} & C_{01} & C_{02} \\ C_{10} & C_{11} & C_{12} \end{bmatrix}$$

$$= \begin{bmatrix} 0.500\,\alpha_R & -0.419\,\alpha_G & -0.081\,\alpha_B \\ -0.169\,\alpha_R & -0.331\,\alpha_G & 0.500\,\alpha_B \end{bmatrix} \qquad \text{[Mathematical expression 7]}$$

It should be noted that an integral value may be used as each value in the matrix as in [Mathematical expression 8].

$$C_{00} = (50 \times \alpha_R)/100$$

$$C_{01} = (-42 \times \alpha_G)/100$$

$$C_{02} = (-8 \times \alpha_B)/100$$

$$C_{10} = (-17 \times \alpha_G)/100$$

$$C_{11} = (-33 \times \alpha_B)/100$$

$$C_{12} = (50 \times \alpha_B)/100 \qquad \text{[Mathematical expression 8]}$$

(Conversion of RGB Data into CrCb Data)

The AF pixel interpolation unit 45 converts the pixel RGB data included in the extracted target region, into the CrCb data by using the obtained matrix (S-15). The AF pixel interpolation unit 45 refers to the positional information of the target region and performs matrix conversion of the pixel RGB data included in the target region into CrCb data by using [Mathematical expression 6] and [Mathematical expression 7].

It should be noted that, when the AWB evaluation data is not the YRGB data but YCrCb data, it is not necessary to perform the above-described color space conversion processing. In this case, the Cr value and the Cb value may be corrected through the use of the corrected values of the color gain values to be used for the white balance processing, as to the Cr value and the Cb value.

Furthermore, while explanation is made for the case of converting the RGB data of the pixel included in the extracted target region, into the CrCb data, also the whole RGB data can be converted into the CrCb data.

(Detection of the Magenta Region Included in the Target Region)

The AF pixel interpolation unit 45 determines whether or not the pixel value of each pixel converted into the CrCb data satisfies [Mathematical expression 9] to [Mathematical expression 11] (S-16).

$Cr < Th3 \times Cb$ and $Cr > (Th4/256) \times Cb$     [Mathematical expression 9]

$Cb > Th5$ or $Cr > Th5$     [Mathematical expression 10]

$R < Th1$ and $G < Th1$ and $B < Th1$     [Mathematical expression 11]

Figure 11A:
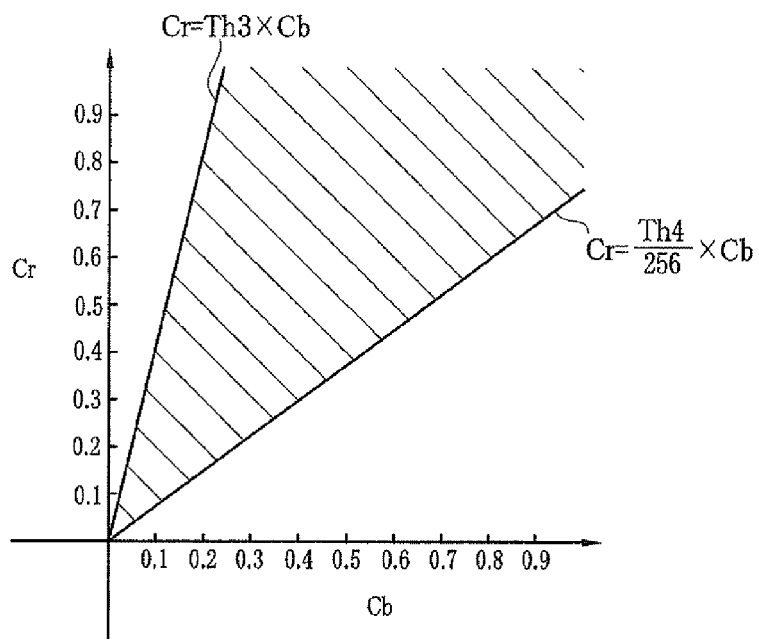
FIG. 11A is a diagram illustrating a color component range based on [Mathematical expression 9]
Figure 11B:
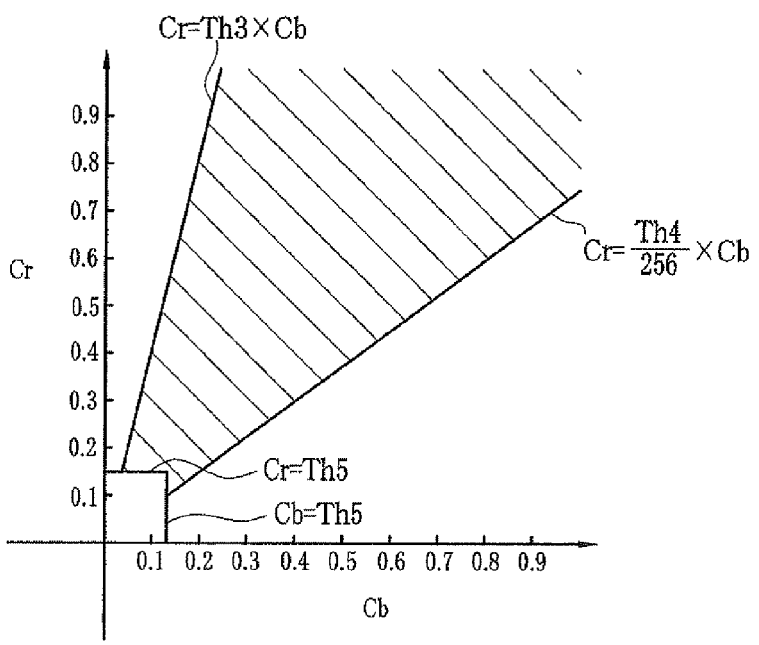
FIG. 11B is a diagram illustrating a color component range based on [Mathematical expression 10] and [Mathematical expression 11].
Figure 12:
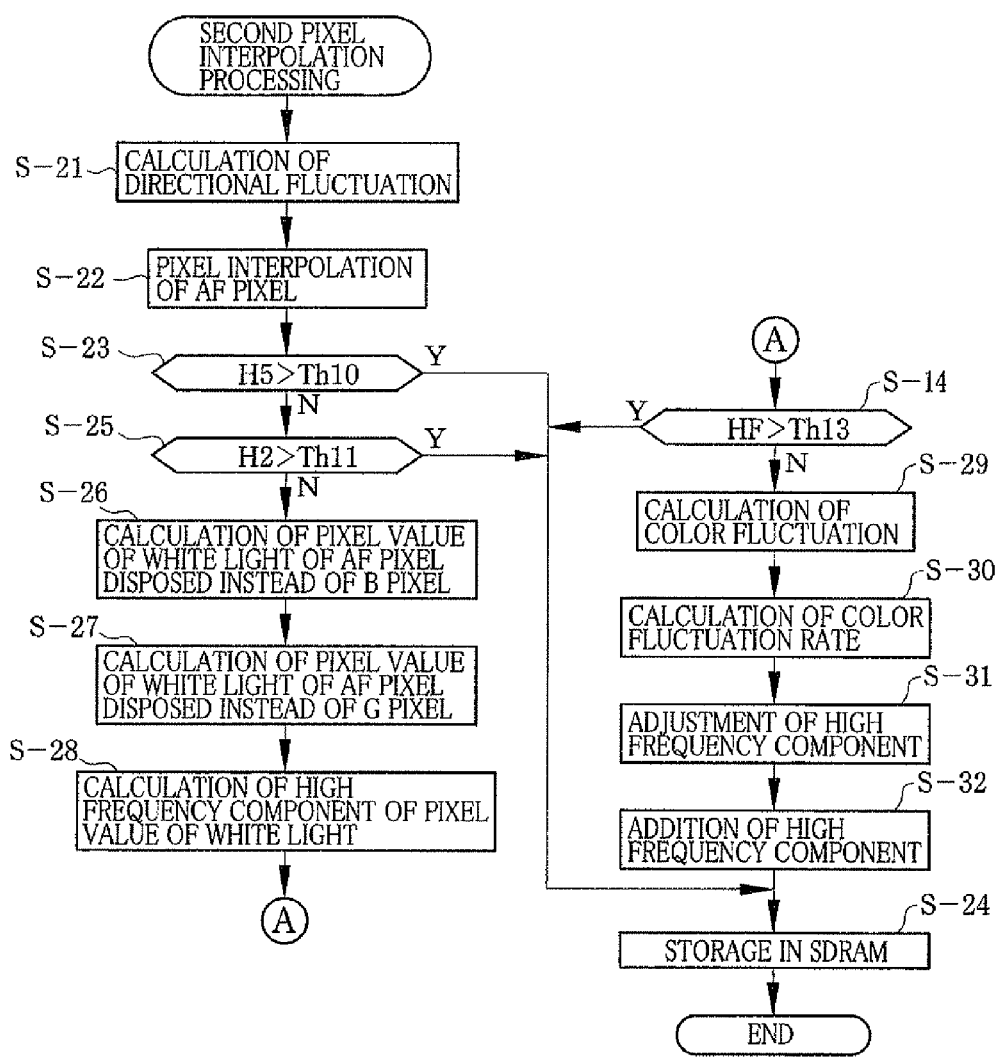
FIG. 12 is a flow chart illustrating a flow of second pixel interpolation processing.

Here, [Mathematical expression 9] is a conditional formula for determining whether or not the pixel value (CrCb) of the pixel included in the target region is included in the magenta color region. As shown in FIG. 11A, a range shown by hatching in the chromaticity diagram is a range shown by [Mathematical expression 9]. Furthermore, [Mathematical expression 10] is a conditional formula for determining whether or not the pixel value (CrCb) of the pixel has a predetermined intensity. Here, when each of the Cr value and the Cb value takes a value of "0" or a value dose to "0", the intensity of the magenta color is week. Accordingly, consideration may be given as to the case where either the Cr value or the Cb value exceeds a predetermined value (here, threshold value Th5). Therefore, the range (range shown by hatching in FIG. 11B) obtained from [Mathematical expression 10] and [Mathematical expression 11] is set to be a color region of the magenta color, and it is determined whether or not the pixel value of the pixel included in the high brightness region is included in this color region. Furthermore, [Mathematical expression 11] is a conditional formula for determining whether or not the R, G, and B color component pixel values of the pixel included in the target region are saturated.

The AF pixel interpolation unit 45 extracts a pixel satisfying the above-described [Mathematical expression 9] to [Mathematical expression 11] from the pixels included in the target region. At this time, the AF pixel interpolation unit 45 obtains an absolute difference sum SAD of the edge amount of Y component in the neighboring four directions by using [Mathematical expression 12].

$$\text{edge\_sum} = \sum_{(i,j)}^{\{\pm 1, \pm 1\}} \text{abs}(Y\_plane[y+i][x+j] - Y\_plane[y][x])$$     [Mathematical expression 12]

The AF pixel interpolation unit 45 obtains an average value of the Y component edge amounts by dividing the absolute difference sum SAD of the edge amount of Y component obtained by [Mathematical expression 12] by a normalizing factor value (=4) of the edge amount. The AF pixel interpolation unit 45 determines whether or not the average value of the Y component edge amounts is equal to or lower than a threshold value Th6. Here, the AF pixel interpolation unit 45 performs the comparison with the threshold value Th6 after having calculated the average value of the Y component edge values, but the AF pixel is not required to be limited to this comparison, and the edge amount of Y component may be compared with the threshold value.

The AF pixel interpolation unit 45, every time specifying a pixel in which [Mathematical expression 9] to [Mathematical expression 11] are satisfied and also pixels in which the average value of the edge amount of Y component is equal to or lower than the threshold value Th6, adds the number of specified pixels. Furthermore, the AF pixel interpolation unit 45 calculates a total edge amount edge_sum by adding the obtained absolute difference sum SAD of the edge amount of Y component, and adds a normalizing factor value edge_count which was used when the average value of the edge amount of Y component was obtained.

Moreover, the AF pixel interpolation unit 45 adds each of the x-coordinate of the specified pixel, a squared value of the x-coordinate (squared x-coordinate value), the y-coordinate, and a squared value of the y-coordinate (squared y-coordinate value). In the following explanation, a value added with the x-coordinate is called an x-coordinate added value ave_x, a value added with the squared x-coordinate value is called a squared x-coordinate added value sqr_x, a value added with the y-coordinate is called a y-coordinate added value ave_y, and a value added with the squared y-coordinate value is called a squared y-coordinate added value sqr_y.

(Evaluation Value Determination)

The AF pixel interpolation unit 45 calculates first to third evaluation values to be explained in the following, and determines these evaluation values (S-17). The AF pixel interpolation unit 45 determines whether the flare is caused or not by determining each of these evaluation values.

The first evaluation value is "the total area of the magenta region" and corresponds to the total number of pixels specified as the magenta region. The AF pixel interpolation unit 45 determines whether or not the first evaluation value exceeds a threshold value Th7 (first evaluation value>threshold value Th7, or not).

The second evaluation value is "the dispersion value/the total area of the magenta region". Generally, the dispersion value is calculated from [Mathematical expression 13].

$$\text{var} = \frac{1}{n}\sum_{j}^{n}(x_j - \bar{x})^2 = \frac{1}{n}\sum_{j}^{n}(x_j^2) - \bar{x}^2$$     [Mathematical expression 13]

When the dispersion value expressed by [Mathematical expression 13] is rewritten as a formula corresponding to a space dispersion value (space moment), [Mathematical expression 14] is obtained.

$$\text{var} = \frac{1}{\text{area\_sum}}(\text{sqr\_x} + \text{sqr\_y}) - \left(\frac{\text{ave\_x}}{\text{area\_sum}}\right)^2 + \left(\frac{\text{ave\_y}}{\text{area\_sum}}\right)^2$$     [Mathematical expression 14]

By using this formula, the AF pixel interpolation unit 45 calculates "the dispersion value/the total area of the magenta region" by [Mathematical expression 15].

$$\frac{var}{area\_sum} = \frac{1}{area\_sum^2}(sqr\_x + sqr\_y) - \frac{ave\_x^2}{area\_sum^3} + \frac{ave\_y^2}{area\_sum^3}$$ [Mathematical expression 15]

The AF pixel interpolation unit 45, using "the dispersion value/the total area" calculated from [Mathematical expression 15] as the second evaluation value, determines whether or not this second evaluation value becomes lower than a threshold value Th8 (second evaluation value<threshold value Th8, or not). It should be noted that while "second evaluation value<threshold value Th8" is assumed, not necessarily limited to this, the condition may be "second evaluation value<1/32 of threshold value Th8". In this case, "32" is a normalizing factor value allotted to the second evaluation value.

The third evaluation value is "the average value of the edge amount of the Y component". The AF pixel interpolation unit 45 calculates the average value of the Y component edge amounts using [Mathematical expression 16].

$$Yedge = edge\_sum / edge\_count$$ [Mathematical expression 16]

The AF pixel interpolation unit 45, using "the average value of the edge amount of the Y component" calculated by [Mathematical expression 16] as the third evaluation value, determines whether or not this third evaluation value becomes lower than a threshold value Th9 (third evaluation value<threshold value Th9, or not).

Then, the AF pixel interpolation unit 45 determines that the flare is caused when all the conditions of "first evaluation value>Th7", "second evaluation value<threshold value Th8", and "third evaluation value<threshold value Th9" are satisfied. In contrast, the AF pixel interpolation unit 45 determines that the flare is not caused when any of these conditions is not satisfied.

It should be noted that, while "the total area of the magenta region"" is the first evaluation value, "the dispersion value/the total area of the magenta region" is the second evaluation value, and "the average value of the edge amount of the Y component" is the third evaluation value and the evaluation value determination is performed using each of these evaluation values, not necessarily limited this method, the evaluation value determination can be performed using at least two of "the total area of the magenta region", "the dispersion value/the total area of the magenta region", and "the average value of the edge amount of the Y component".

In this manner, in the flare determination, the high brightness region is extracted through the use of the Y data of the AWB evaluation data and it is determined whether the magenta region exists or not in this high brightness region. The data to be used in the determination whether this magenta region exists or not is the data subjected to the color space conversion processing using the matrix obtained when each component of the color space conversion matrix is multiplied by the correction coefficient calculated through the use of the gain value used in the white balance processing. Here, the color space conversion processing is performed using the generated matrix and thereby the pixel value of the pixel in the region where the color mixing is caused in the image by the flare generation is included in the region of the magenta color.

Then, when the magenta region exists in the obtained high brightness region, "the total area of the magenta region", "the dispersion value/the total area of the magenta region", and "the average value of the edge amount of the Y component" are calculated and the flare determination is performed by the threshold value determination of these calculated values. That is, a region in the high brightness portion where the magenta color appears in a cluster and also an edge does not exists is determined to be a region where the color mixing caused by the flare occurs, and, even if a region having the magenta color exists, the magenta color is determined not to be the flare but a color of an object when all the above-described conditions for the first to third evaluation values are not satisfied. Thereby, it becomes possible to determine appropriately whether the flare is caused or not.

It should be noted that, while the YRGB data is used as the ABF evaluation data in the present embodiment, not necessarily limited to this data, YCrCb data may be used, for example. In this case, correction coefficients are obtained through the use of respective color gain values used in the white balance processing and these correction coefficients are multiplied to the input YCrCb data. Then, each of processing steps of the flare determination unit may be performed using the YCrCb data multiplied by the correction coefficients.

In the following, there will be explained each of first pixel interpolation processing, second pixel interpolation processing, and third pixel interpolation processing, which are carried out based on the results of the noise determination and the flare determination by the AF pixel interpolation unit 45.

[First Pixel Interpolation Processing]

As the first pixel interpolation processing, a pixel value of AF pixel is determined by performing average interpolation on pixel values of imaging pixels positioned in the neighborhood of the AF pixel, for example. Concretely, in FIG. 3, a pixel value of the AF pixel Y42, a pixel value of the AF pixel Y44, and a pixel value of the AF pixel Y46 disposed instead of B pixels are determined from an expression described in [mathematical expression 17], an expression described in [mathematical expression 18], and an expression described in [mathematical expression 19], respectively.

$$Y42 = (B22 + B62)/2$$ [Mathematical expression 17]

$$Y44 = (B24 + B64)/2$$ [Mathematical expression 18]

$$Y46 = (B26 + B66)/2$$ [Mathematical expression 19]

Further, a pixel value of the AF pixel X43, and a pixel value of the AF pixel X45 disposed instead of G pixels are determined from an expression described in [mathematical expression 20], and an expression described in [mathematical expression 21], respectively.

$$X43 = (G32 + G34 + G52 + G54)$$ [Mathematical expression 20]

$$X45(G34 + G36 + G54 + G56)/4$$ [Mathematical expression 21]

As described above, when the amount of noise is large, the pixel value of the AF pixel is not used, and the pixel value of the AF pixel is estimated only from the pixel values in the neighborhood of the AF pixel, so that it is possible to suppress, as much as possible, that the estimated pixel values of AF pixels vary and thus the interpolation beyond the assumption is performed, resulting in that a color, which does not actually exist, called as a false color is generated and a structure, which does not exist, called as a false structure is generated. Note that the image data in which the pixel values of the AF pixels are interpolated into the pixel values of the imaging pixels is subjected to color interpolation, in the image processing unit 25, from the Bayer pattern into the RGB based on the linear interpolation method, and the resultant is stored in the SDRAM 27 as image data for each RGB.

[Second Pixel Interpolation Processing]

By using the pixel values of the imaging pixels in the neighborhood of the AF pixel, a direction in which a fluctuation value being a fluctuation rate of the pixel values becomes the smallest, is determined. Further, by using the pixel values of the imaging pixels positioned in the direction with the smallest fluctuation, the pixel value of the AF pixel is interpolated.

(Calculation of Direction in which Fluctuation Value Becomes the Smallest)

In order to perform interpolation with respect to the AF pixels at X45 and Y44, the AF pixel interpolation unit 45 uses the pixel values of the imaging pixels in the neighborhood of X45 and Y44, to thereby determine each of values of directional fluctuations H1 to H4 being fluctuation rates of pixel values in four directions, using [mathematical expression 22] to [mathematical expression 25] (S-21). Note that the four directions in the present embodiment indicate a horizontal scanning direction, a vertical scanning direction, a direction of 45 degrees with respect to the horizontal scanning direction, and a direction of 135 degrees with respect to the horizontal scanning direction.

directional fluctuation $H1$ in the horizontal scanning direction=$2\times(|G34-G36|+|G54-G56|)+|R33-R35|+|R53-R55|+|B24-B26|+|B64-B66|$ [Mathematical expression 22]

directional fluctuation $H2$ in the vertical scanning direction=$2\times(|G34-G54|+G36-G56|)+|R33-R53|+|R35-R55|+|B24-B64|+|B26-B66|$ [Mathematical expression 23]

directional fluctuation $H3$ in the direction of 45 degrees with respect to the horizontal scanning direction=$2\times(|G27-G36|+|G54-G63|)+|R35-R53|+|R37-R55|+|B26-B62|+|B28-B64|$ [Mathematical expression 24]

directional fluctuation $H4$ in the direction of 135 degrees with respect to the horizontal scanning direction=$2\times(|G23-G34|+|G56-G67|)+|R33-R55|+|R35-R57|+|B22-B66|+|B24-B68|$ [Mathematical expression 25]

(Interpolation of Pixel Values of AF Pixels by Using Pixel Values of Neighboring Imaging Pixels in Accordance with Direction with the Smallest Fluctuation Value)

The AF pixel interpolation unit 45 selects the direction with the directional fluctuation of the smallest value among the directional fluctuations H1 to H4 determined in step S-21, and determines, by using the pixel values of the imaging pixels positioned in that direction, a pixel value $G_{X45}$ of imaging pixel of G at the position of the AF pixel X45 and a pixel value $B_{Y44}$ of imaging pixel of B at the position of the AF pixel Y44, using an expression, among [mathematical expression 26] to [mathematical expression 29], corresponding to the selected direction (S-22). Accordingly, by using the pixel values of the imaging pixels positioned in the direction with the small fluctuation, it becomes possible to perform the interpolation with respect to the AF pixels at X45, Y44 and the like more correctly.

When the directional fluctuation H1 is the smallest $B_{Y44}=(B24+B64)/2$ $G_{X45}=(G34+G36+G54+G56)/4$ [Mathematical expression 26]

When the directional fluctuation H2 is the smallest $B_{Y44}=(B24+B64)/2$ $G_{X45}=(G25+G65)/2$ [Mathematical expression 27]

When the directional fluctuation H3 is the smallest $B_{Y44}=(B26+B62)/2$ $G_{X45}=(G36+G54)/2$ [Mathematical expression 28]

When the directional fluctuation H4 is the smallest $B_{Y44}=(B22+B66)/2$ $G_{X45}=(G34+G56)/2$ [Mathematical expression 29]

The AF pixel interpolation unit 45 calculates a directional fluctuation H5 of the pixel values of the AF pixels in the horizontal scanning direction being an arranging direction of the AF pixels, by using, for example, pixel values W44 and W45 of white light at Y44 and X45 of the AF pixels, and [mathematical expression 30].

$H5=|W44-W45|$ [Mathematical expression 30]

The AF pixel interpolation unit 45 determines whether or not the value of the directional fluctuation H5 exceeds a threshold value Th10 (S-23). When the directional fluctuation H5 has a value exceeding the threshold value Th10 (YES side), the AF pixel interpolation unit 45 sets the interpolated values of $B_{Y44}$ and $G_{X45}$ determined in step S-22 to the pixel values of the imaging pixels at Y44 and X45, and updates the image data. The image processing unit 25 performs pixel interpolation of three colors with respect to the updated image data to generate image data of three colors, and records the image data of three colors in the SDRAM 27 via the bus 26 (S-24).

On the other hand, when the directional fluctuation H5 becomes equal to or less than the threshold value Th10 (NO side), the image processing unit 25 proceeds to S-25. Note that when a 12-bit image is processed, for example, the threshold value Th10 may be set to a value of about 512.

The AF pixel interpolation unit 45 determines whether or not the directional fluctuation H2 determined in step S-21 exceeds a threshold value Th11 (S-24). When the directional fluctuation H2 has a value exceeding the threshold value Th11 (YES side), the AF pixel interpolation unit 45 sets the interpolated values of $B_{Y44}$ and $G_{X45}$ determined in step S-22 to the pixel values of the imaging pixels at Y44 and X45, and updates the image data. The image processing unit 25 performs pixel interpolation of three colors with respect to the updated image data to generate image data of three colors, and stores the image data of three colors in the SDRAM 27 via the bus 26 (S-24).

On the other hand, when the directional fluctuation H2 becomes equal to or less than the threshold value Th11 (NO side), the image processing unit 25 proceeds to S-26. Note that when the 12-bit image is processed, for example, the threshold value Th 11 may be set to a value of about 64.

After that, the AF pixel interpolation unit 45 calculates an average pixel value <W44> of white light in the AF pixel at Y44 and the like having the sensitivity to the luminous flux from the right side and the like, by using pixel values of imaging pixels of color components R, G and B positioned in the neighborhood of the AF pixel (S-26). Concretely, when the image processing unit 25 determines that the directional fluctuation H2 is the smallest, for example, in step S-21, B24 and B64 in the expression described in [mathematical expression 27] are used as the pixel values of the imaging pixels of B. Meanwhile, regarding the pixel values of R and G, interpolation calculation of pixel values of R and G at the positions of imaging pixels B24 and B64 of B is conducted by using four expressions described in [mathematical expression 31].

[Mathematical expression 31]

$$R_{B24}=(R13+R15+R33+R35)/4 \quad (1)$$

$$G_{B24}=(G14+G23+G25+G34)/4 \quad (2)$$

$$R_{B64}=(R53+R55+R73+R75)/4 \quad (3)$$

$$G_{B64}=(G54+G63+G65+G74)/4 \quad (4)$$

Subsequently, the AF pixel interpolation unit 45 calculates pixel values W24 and W64 of white light at the positions of the imaging pixels B24 and B64, through a weighted sum represented by expressions described in [mathematical expression 32] by using weighted coefficients WR, WG and WB of R, G and B transferred from the CPU 11. Note that a method of determining the weighted coefficients WR, WG and WB will be described later.

$$W24=WR \times R_{B24}+WG \times G_{B24}+WB \times B24$$

$$W64=WR \times R_{B64}+WG \times G_{B64}+WB \times B64 \quad \text{[Mathematical expression 32]}$$

Further, the image processing unit 25 calculates the average pixel value <W44> of white light at Y44=(W24+W64)/2.

The AF pixel interpolation unit 45 calculates an average pixel value <W45> of white light in the AF pixel at X45 and the like having the sensitivity to the luminous flux from the left side and the like, by using pixel values of imaging pixels of color components R, G and B positioned in the neighborhood of the AF pixel, similar to the case of step S-26 (S-27). When the image processing unit 25 determines that the directional fluctuation H2 is the smallest, in step S-21, G25, and G65 in the expression described in [mathematical expression 27] are used as the pixel values of the imaging pixels of G. Meanwhile, regarding the pixel values of R and B, interpolation calculation of pixel values of R and B at the positions of imaging pixels G25 and G65 of G is conducted by using four expressions described in [mathematical expression 33].

[Mathematical expression 33]

$$R_{G25}=(R15+R35)/2 \quad (1)$$

$$B_{G25}=(B24+B26)/2 \quad (2)$$

$$R_{G65}=(R55+R75)/2 \quad (3)$$

$$B_{G65}=(B64+B66)/2 \quad (4)$$

Subsequently, the AF pixel interpolation unit 45 calculates pixel values W25 and W65 of white light at the positions of the imaging pixels G25 and G65, through a weighted sum represented by expressions described in [mathematical expression 34].

$$W25=WR \times R_{G25}+WG \times G25+WB \times B_{G25}$$

$$W65=WR \times R_{G65}+WG \times G25+WB \times B_{G65} \quad \text{[Mathematical expression 34]}$$

Subsequently, the image processing unit 25 calculates the average pixel value <W45> of white light at X45=(W25+W65)/2.

The AF pixel interpolation unit 45 determines a high frequency component of pixel value of white light in each AF pixel of the imaging element 17, by using the average pixel values of white light determined in S-26 and S-27 (S-28). At first the AF pixel interpolation unit 45 determines an average pixel value of white light at the pixel position of each AF pixel, from the pixel value of each AF pixel of the imaging element 17. Specifically, the pixel value of each AF pixel is a value as a result of pupil-dividing the luminous flux from the left side or the right side. Therefore, in order to obtain the pixel value of white light at the position of each AF pixel, there is a need to add mutual pixel values of luminous flux from the left side and the right side. Accordingly, the AF pixel interpolation unit 45 of the present embodiment calculates, by using the pixel value of each AF pixel and the pixel values of the adjacent AF pixels, the average pixel values of white light at the positions of AF pixels Y44 and X45, using expressions described in [mathematical expression 35].

$$<W44>'=W44+(W43+W45)/2$$

$$<W45>'=W45+(W44+W46)/2 \quad \text{[Mathematical expression 35]}$$

Note that since the pixel value of white light at the position of each AF pixel is calculated by using the pixel values of the AF pixels adjacent in the arranging direction of the AF pixels, in [mathematical expression 35] explained in step S-27, when there is a large fluctuation in the arranging direction, the calculation of high frequency component is incorrectly performed, resulting in that a resolution in the arranging direction of the pixel values of white light may be lost. Therefore, the aforementioned step S-23 is designed to stop the addition of high frequency component, when there is a large fluctuation in the arranging direction.

After that, the AF pixel interpolation unit 45 determines, from expressions described in [mathematical expression 36], high frequency components HF$_{Y44}$ and HF$_{X45}$ of white light at the positions of Y44 and X45.

$$HF_{Y44}<W44>'-<W44>$$

$$HF_{X45}<W45>'-<W45> \quad \text{[Mathematical expression 36]}$$

The AF pixel interpolation unit 45 determines whether or not a ratio of the high frequency component HF of the pixel value of white light at the position of each AF pixel determined in step S-28 to the pixel value of the white light is smaller than a threshold value Th13 (which is about 10%, for example, in the present embodiment) (S-29). If the high frequency component HF is smaller than the threshold value Th13 (YES side), the AF pixel interpolation unit 45 sets the interpolated values of B$_{Y44}$ and G$_{X45}$ determined in step S-26 to the pixel values of the imaging pixels at Y44 and X45, and updates the image data. The image processing unit 25 performs pixel interpolation of three colors with respect to the updated image data to generate image data of three colors, and stores the image data of three colors in the SDRAM 27 via the bus 26 (S-24).

On the other hand, if the high frequency component HF is equal to or more than the threshold value Th13 (NO side), the AF pixel interpolation unit 45 proceeds to step S-30. Note that explanation regarding the value of the threshold value Th13 will be made together with the later explanation regarding the weighted coefficients WR, WG and WB.

The AF pixel interpolation unit 45 calculates color fluctuations VR, VGr, VB and VGb of the pixel values of the imaging pixels of each color component R, G or B in the neighborhood of Y44 and X45 (S-30). Here, each of the color fluctuations VGr and VGb indicates color fluctuations of G at the positions of imaging pixels of R or B. The AF pixel interpolation unit 45 determines the color fluctuations VR and VGr based on two expressions described in [mathematical expression 37].

(1) $VR = |R33 - R53| + |R35 - R55| +$ [Mathematical expression 37]

$|R37 - R57|$ (2) $VGr = |(G32 + G34)/2 - (G52 + G54)/2| +$ $|(G34 + G36)/2 - (G54 + G56)/2| +$ $|(G36 + G38)/2 - (G56 + G58)/2|$

Note that the AF pixel interpolation unit 45 of the present embodiment calculates the value of VGr after determining an average value of pixel values of G at the positions R33, R35, R37, R53, R55, and R57 of the imaging pixels of R.

Meanwhile, the AF pixel interpolation unit 45 determines the color fluctuations VB and VGb based on two expressions described in [mathematical expression 38].

(1) $VB = |B22 - B62| + |B24 - B64| +$ [Mathematical expression 38]

$|B26 - B66|$ (2) $VGb = |(G21 + G23)/2 - (G61 + G63)/2| +$ $|(G23 + G25)/2 - (G63 + G65)/2| +$ $|(G25 + G27)/2 - (G65 + G67)/2|$

Note that the AF pixel interpolation unit 45 of the present embodiment calculates the value of VGb after determining an average value of pixel values of G at the positions B22, B24, B26, B62, B64, and B66 of the imaging pixels of B.

The AF pixel interpolation unit 45 uses the color fluctuations VR, VGr, VB, and VGb calculated in step S-30 to calculate color fluctuation rates $K_{WG}$ and $K_{WB}$ to white color of the color components G and B (S-31). First, the AF pixel interpolation unit 45 determines, by using the color fluctuations VR, VGr, VB and VGb, color fluctuations VR2, VG2 and VB2 from three expressions described in [mathematical expression 39].

[Mathematical expression 39]

$VR2 = (VR+\alpha) \times (VGb+\alpha)$ (1)

$VB2 = (VB+\alpha) \times (VGr+\alpha)$ (2)

$VG2 = (VGb+\alpha) \times (VGr+\alpha)$ (3)

Here, α is an appropriate constant for stabilizing the value of the color fluctuation rate, and α may be set to a value of about 256, when the 12-bit image is processed, for example.

Subsequently, the image processing unit 25 uses the color fluctuations VR2, VG2 and VB2 to calculate a color fluctuation VW to white color, based on an expression described in [mathematical expression 40].

$VW = VR2 + VG2 + VB2$ [Mathematical expression 40]

Accordingly, the AF pixel interpolation unit 45 calculates the color fluctuation rates $K_{WG}$ and $K_{WB}$ from [mathematical expression 41].

$K_{WG} = VG2/VW$ $K_{WB} = VB2/VW$ [Mathematical expression 41]

The AF pixel interpolation unit 45 uses the high frequency component HF of the pixel value of white light at the position of each AF pixel determined in step S-28, and the color fluctuation rates $K_{WG}$ and $K_{WB}$ calculated in step S-31 to calculate high frequency components of the pixel values of the color components G and B at the positions of respective AF pixels, from expressions described in [mathematical expression 42] (S-32).

$HFB_{Y44} = HF_{Y44} \times K_{WB}$ $HFG_{X45} = HF_{X45} \times K_{WG}$ [Mathematical expression 42]

The AF pixel interpolation unit 45 adds the high frequency components of the respective color components in the respective AF pixels determined in step S-32 to the pixel values of the imaging pixels interpolated and determined in step S-22 (S-33). The CPU 11 calculates imaging pixel values B' and G' at Y44 and X45, respectively, based on expressions described in [mathematical expression 43], for example.

$B'_{Y44} = B_{Y44} + HFB_{Y44}$ $G'_{X45} = G_{X45} + HFG_{X45}$ [Mathematical expression 43]

The AF pixel interpolation unit 45 sets the pixel values of $B'_{Y44}$, $G'_{X45}$ and the like interpolated and determined at the positions of AF pixels at Y44, X45 and the like, to the pixel values of the imaging pixels at the respective positions, and updates the image data. The image processing unit 25 converts the updated image data into image data in which one pixel has three colors, and stores the resultant in the SDRAM 27 (S-24).

Note that even if there is no fluctuation in the arranging direction of AF pixels, the high frequency components of the pixel values of white light have a slight error due to a variation between the weighted sum of the spectral characteristics of the imaging pixels of the respective color components and the spectral characteristics of the AF pixels. When there is no large fluctuation in the image in the vertical scanning direction (direction that intersects with the arranging direction of AF pixels), the accuracy of interpolation value is sufficient even if the high frequency component is not added, and there is a possibility that the addition of high frequency component only generates a false structure due to an error. Accordingly, in such a case, the addition of high frequency component is suppressed in step S-25. Further, when the calculated high frequency component is small enough, the accuracy of interpolation value is sufficient even if the high frequency component is not added, and there is a possibility that the addition of high frequency component only generates a false structure due to an error. Accordingly, it is designed that, in such a case, the addition of high frequency component is suppressed in S-25.

Next, the method of determining the weighted coefficients WR, WG and WB will be described together with the threshold value Th13. In order to determine such weighted coefficients and threshold value, the imaging element 17 to be incorporated in a product or an imaging element having the same performance as that of the imaging element 17 is prepared. An illumination with substantially uniform illuminance is irradiated to the imaging element 17 while changing wavelength bands in various ways, and imaged image data with respect to each wavelength band is obtained. Further, to the imaged image data n of each wavelength band, the pixel values of AF pixels with different pupil division are added as in the expression described in [mathematical expression 35], to thereby calculate a pixel value Wn of white light. At the same time, extraction is also performed on pixel values Rn, Gn, and Bn of imaging pixels of respective color components positioned in the neighborhood of the AF pixel.

Further, as a function of unknown weighted coefficients WR, WG, and WB, a square error E is defined as [mathematical expression 44].

$$E=\Sigma n(WR \times Rn+WG \times Gn+WB \times Bn-Wn)^2 \text{[Mathematical expression 44]}$$

Further, the weighted coefficients WR, WG, and WB that minimize E are determined (the weighted coefficients WR, WG, and WB that make a value obtained by partially differentiating E with each WR, WG, or WB to "0", are determined). By determining the weighted coefficients WR, WG, and WB as described above, the weighted coefficients with which the spectral characteristics of the AF pixel are represented by the weighted sum of the spectral characteristics of the imaging pixels of respective color components R, G and B are determined. The weighted coefficients WR, WG, and WB determined as above are recorded in the non-volatile memory 12 of the electronic camera 10.

Further, an error rate Kn for each of the pieces of imaged image data n is determined based on the determined weighted coefficients WR, WG, and WB, using an expression described in [mathematical expression 45].

$$Kn=|WR \times Rn+WG \times Gn+WB \times Bn-Wn|/Wn \text{ [Mathematical expression 45]}$$

Further, a maximum value of Kn is determined, and is recorded in the non-volatile memory 12 as the threshold value Th13.

Figure 13:
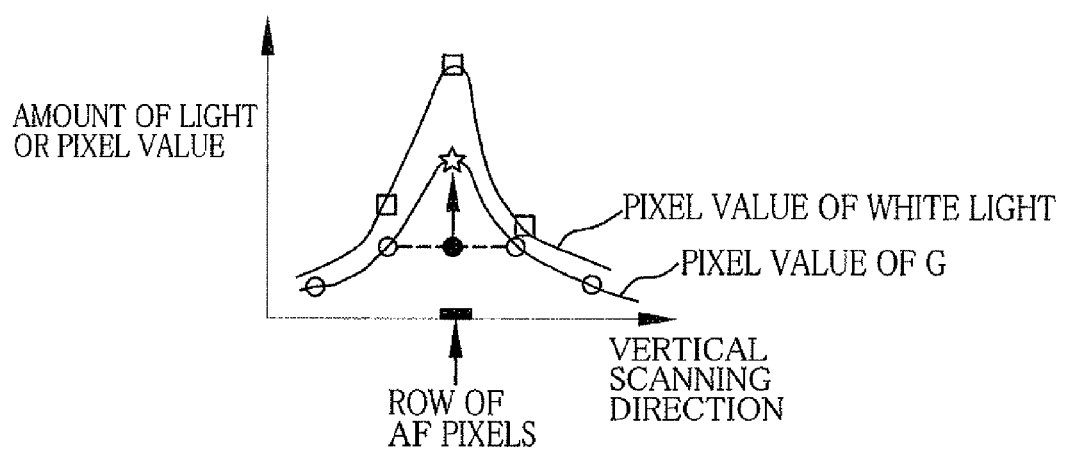
FIG. 13 is a diagram representing an example of image structure in which an effect of the present embodiment is exerted.

FIG. 13 represents an example of image structure in which an effect of the present embodiment is exerted. FIG. 13 is a longitudinally-sectional view of an image structure of longitudinal five pixels including a convex structure (bright line or points), in which a horizontal axis indicates a vertical scanning direction (y-coordinate), and a vertical axis indicates a light amount or a pixel value. Further, the convex structure is positioned exactly on the AF pixel row arranged in the horizontal scanning direction.

Marks ○ in FIG. 13 indicate pixel values imaged by the imaging pixels of G. However, since the imaging pixel of G does not exist at the position of the AF pixel, the pixel value of G at that position cannot be obtained. Therefore, when the convex structure is positioned exactly at the position of the AF pixel, the convex structure in FIG. 13 cannot be reproduced from only the pixel values of the imaging pixels of G in the neighborhood of the AF Actually, in S-22, the pixel value of G (mark • in FIG. 13) interpolated and determined at the position of the AF pixel by using the pixel values of the imaging pixels of G in the neighborhood of the AF pixel does not reproduce the convex structure.

Meanwhile, at the position of the AF pixel, a pixel value of white light is obtained. However, although a normal pixel receives light passing through an entire area of the pupil, the AF pixel receives only light passing through the right side or the left side of the pupil, so that by adding the adjacent AF pixels which are different in pupil division, a pixel value of normal white light (light passing through the entire area of the pupil) is calculated ([mathematical expression 35]).

Further, by interpolating and generating the other color components R and B at the position of the imaging pixel of G in the neighborhood of the AF pixel, and determining the weighted sum of the color components R, G, and B, it is possible to determine the pixel value of white light with sufficient accuracy in many cases ([mathematical expression 32] and [mathematical expression 34]).

Marks □ in FIG. 13 represent a distribution of the pixel values of white light determined as above. In many cases, a high frequency component of the pixel value of white light and a high frequency component of the pixel value of the color component G are proportional to each other, so that the high frequency component calculated from the pixel value of white light has information regarding the convex structure component of the pixel value of G. Accordingly, the high frequency component of the pixel value of G is determined based on the high frequency component of the pixel value of white light, and the determined value is added to data indicated by the mark •, resulting in that a pixel value of G indicated by a mark ☆ is obtained, and the convex structure is reproduced ([mathematical expression 42]).

[Third Pixel Interpolation Processing]

The AF pixel interpolation unit 45 selects and executes the third pixel interpolation processing, when the amount of noise is small based on the result of determination made by the noise determination unit 46, and the flare determination unit 47 determines that the flare is easily generated.

The third pixel interpolation processing is processing in which processing of correcting the pixel values of the imaging pixels in the neighborhood of the AF pixel using weighting coefficients and smoothing the corrected pixel values of the imaging pixels, is performed two times while changing the weighting coefficients with respect to the pixel values of the imaging pixels, and thereafter, the aforementioned second pixel interpolation processing is executed. Hereinafter, explanation will be made on the third pixel interpolation processing with respect to two columns of the AF pixel X43 and the AF pixel Y44 in FIG. 3.

(Correction of Pixel Values of Imaging Pixels in the Neighborhood of AF Pixel Columns Using Weighting Coefficients)

As illustrated in FIG. 14, the AF pixel interpolation unit 45 determines whether or not the pixel values of the imaging pixels arranged in the neighborhood of the AF pixel columns become equal to or more than a threshold value MAX_RAW, and performs correction using set weighting coefficients based on the determination result (S-41). Here, the threshold value MAX_RAW is a threshold value for determining whether or not the pixel value is saturated.

When the pixel value of the imaging pixel becomes equal to or more than the threshold value MAX_RAW, the AF pixel interpolation unit 45 does not perform the correction on the pixel value of the imaging pixel. On the other hand, when the pixel value of the imaging pixel becomes less than the threshold value MAX_RAW, the AF pixel interpolation unit 45 corrects the pixel value of the imaging pixel by subtracting a value of the weighted sum using the weighting coefficients from the original pixel value.

The AF pixel interpolation unit 45 corrects the pixel values of the imaging pixels of R color component using [mathematical expression 46] to [mathematical expression 49].

$$R13' = R13 - (R3U\_0 \times R33 + R3U\_1 \times G34 + R3U\_2 \times B24)$$ [Mathematical expression 46]

$$R33' = R33 - (R1U\_0 \times R33 + R1U\_1 \times G34 + R1U\_2 \times B24)$$ [Mathematical expression 47]

$$R53' = R53 - (R1S\_0 \times R53 + R1S\_1 \times G54 + R1S\_2 \times B64)$$ [Mathematical expression 48]

$$R73' = R73 - (R3S\_0 \times R53 + R3S\_1 \times G54 + R3S\_2 \times B64)$$ [Mathematical expression 49]

Here, R1U_0, R1U_1, R1U_2, R1S_0, R1S_1, R1S_2, R3U_0, R3U_1, R3U_2, R3S_0, R3S_1, R3S_2 are the weighting coefficients. Note that in the weighting coefficients, a character S indicates a position above the AF pixel, and a character U indicates a position below the AF pixel.

The AF pixel interpolation unit 45 corrects the pixel values of the imaging pixels of G color component using [mathematical expression 50] to [mathematical expression 55].

$$G14' = G14 - (G3U\_0 \times R33 + G3U\_1 \times G34 + G3U\_2 \times B24)$$ [Mathematical expression 50]

$$G23' = G23 - (G2U\_0 \times R33 + G2U\_1 \times G34 + G2U\_2 \times B24)$$ [Mathematical expression 51]

$$G34' = G34 - (G1U\_0 \times R33 + G1U\_1 \times G34 + G1U\_2 \times B24)$$ [Mathematical expression 52]

$$G54' = G54 - (G1S\_0 \times R53 + G1S\_1 \times G54 + G2S\_2 \times B64)$$ [Mathematical expression 53]

$$G63' = G63 - (G2S\_0 \times R53 + G2S\_1 \times G54 + G2S\_2 \times B64)$$ [Mathematical expression 54]

$$G74' = G74 - (G3S\_0 \times R53 + G3S\_1 \times G54 + G3S\_2 \times B64)$$ [Mathematical expression 55]

Here, G1U_0, G1U_1, G1U_2, G1S_0, G1S_1, G1S_2, G2U_0, G2U_1, G2U_2, G2S_0, G2S_1, G2S_2, G3U_0, G3U_1, G3U_2, G3S_0, G3S_1, G3S_2 are the weighting coefficients.

Further, the AF pixel interpolation unit 45 corrects the pixel values of the imaging pixels of B color component using [mathematical expression 56] and [mathematical expression 57].

$$B24' = B24 - (B2U\_0 \times R33 + B2U\_1 \times G34 + B2U\_2 \times B24)$$ [Mathematical expression 56]

$$B64' = B64 - (B2S\_0 \times R53 + B2S\_1 \times G54 + B2S\_2 \times B64)$$ [Mathematical expression 57]

Here, B2U_0, B2U_1, B2U_2, B2S_0, B2S_1, B2S_2 are the weighting coefficients.

(Calculation of Clip Amount Using Pixel Values of Adjacent AF Pixels)

The AF pixel interpolation unit 45 reads the pixel values X43 and Y44 of the adjacent AF pixels, and determines a clip amount Th_LPF by using [mathematical expression 58] (S-42).

$$Th\_LPF = (X43 + Y44) \times K\_Th\_LPF$$ [Mathematical expression 58]

Here, K_Th_LPF is a coefficient, which applies a value of about "127". The larger the value of the coefficient K_Th_LPF, the higher the effect of the smoothing processing.

(Calculation of Prediction Error for Each Color Component)

The AF pixel interpolation unit 45 calculates a difference between a pixel value of the imaging pixel at a position far from the AF pixel 41 (distant imaging pixel) and a pixel value of the imaging pixel at a position close to the AF pixel 41 (proximal imaging pixel), among the imaging pixels with the same color component arranged on the same column, as a prediction error, by using [mathematical expression 59] and [mathematical expression 60] (S-43).

$$deltaRU = R13' - R33'$$

$$deltaRS = R73' - R53'$$ [Mathematical expression 59]

$$deltaGU = G14' - G34'$$

$$deltaGS = G74' - G54'$$ [Mathematical expression 60]

(Determination Whether or not the Predicted Error Exceeds a Clipping Range)

The AF pixel interpolation unit 45 determines whether or not each value of the prediction errors deltaRU, deltaRS, deltaGU, and deltaGS determined through [mathematical expression 59] and [mathematical expression 60] falls within a clip range (−Th_LPF to Th_LPF) based on the clip amount determined in [mathematical expression 58] (S-44).

(Clipping Processing)

The AF pixel interpolation unit 45 performs clip processing on the prediction error, among the prediction errors deltaRU, deltaRS, deltaGU, and deltaGS, which is out of the clip range (S-45). Here, the clip processing is processing of clipping the value of the prediction error which is out of the clip range to make the value fall within the clip range.

(Addition of Prediction Errors to Pixel Values of Proximal Imaging Pixels)

The AF pixel interpolation unit 45 adds the prediction errors to the pixel values of the proximal imaging pixels on the respective columns, through [mathematical expression 61] (S-46). Here, the prediction errors have the values determined through [mathematical expression 59] and [mathematical expression 60], or the clipped values.

$$R33'' = R33' + deltaRU$$

$$R53'' = R53' + deltaRS$$

$$G34'' = G34' + deltaGU$$

$$G54'' = G54' + deltaGS$$ [Mathematical expression 61]

Accordingly, the pixel values of the distant imaging pixels and the pixel values of the proximal imaging pixels being the pixel values of the imaging pixels in the neighborhood of the AF pixel columns are respectively corrected, and further, by the smoothing processing using the prediction errors, the pixel values of the proximal imaging pixels are corrected.

(Storage of the Corrected Pixel Value for the Imaging Pixel into the SDRAM)

The AF pixel interpolation unit 45 stores the pixel values of the distant imaging pixels corrected by the weighting coefficients and the pixel values of the proximal imaging pixels corrected by the prediction errors, in the SDRAM 27 (S-47).

When the processing of the first time is completed, the processing of the second time is executed.

(Correction of the Pixel Value for the Imaging Pixel Around the AF Pixel by Using the Weighting Coefficient)

The AF pixel interpolation unit 45 determines, by using the pixel values of the imaging pixels corrected through the processing of the first time, whether or not the pixel values of these imaging pixels become equal to or more than the threshold value MAX_RAW. Based on a result of the determination, the correction is performed using the set weighting coefficients (S-48). Here, the threshold value MAX_RAW is a threshold value for determining whether or not the pixel value is saturated, and the same value as that in the processing of the first time (S-41) is used.

When the pixel value of the imaging pixel becomes equal to or more than the threshold value MAX_RAW, the AF pixel interpolation unit 45 does not perform the correction on the pixel value of the imaging pixel. When the pixel value of the imaging pixel becomes less than the threshold value MAX_RAW, the AF pixel interpolation unit 45 performs correction by changing all of the weighting coefficients in the above-described [mathematical expression 46] to [mathematical expression 57] to "0". Specifically, when the processing is conducted, the pixel values of the imaging pixels arranged in the neighborhood of the AF pixel columns stay as their original pixel values.

(Calculation of the Clipping Amount Using the Pixel Value of the Neighboring AF Pixels)

The AF pixel interpolation unit 45 reads the pixel values X43 and Y44 of the adjacent AF pixels, and determines a clip amount Th_LPF by using the above-described [mathematical expression 58] (S-49). Here, as the value of K_Th_LPF, the same value as that in the processing of the first time is used.

(Calculation of the Predicted Error for Each Color Component)

The AF pixel interpolation unit 45 calculates a difference between a pixel value of the distant imaging pixel and a pixel value of the proximal imaging pixel, among the imaging pixels with the same color component arranged on the same column, as a prediction error, by using the above-described [mathematical expression 59] and [mathematical expression 60] (S-50).

(Determination Whether or not the Predicted Error is Outside the Clipping Range)

The AF pixel interpolation unit 45 determines whether or not each value of the prediction errors deltaRU, deltaRS, deltaGU, and deltaGS determined by the above-described [mathematical expression 59] and [mathematical expression 60] falls within a clip range (−Th_LPF to Th_LPF) based on the clip amount determined through [mathematical expression 58] (S-51).

(Clipping Processing)

The AF pixel interpolation unit 45 performs clip processing on the prediction error, among the prediction errors deltaRU, deltaRS, deltaGU, and deltaGS, which is out of the clip range (S-52).

(Addition of the Predicted Error to the Proximal Imaging Pixel)

The AF pixel interpolation unit 45 adds the prediction errors to the pixel values of the proximal imaging pixels on the respective columns, using the above-described [mathematical expression 61] (S-53).

Accordingly, in the processing of the second time, the pixel values of the proximal imaging pixels are further corrected using the prediction errors.

(Storage of the Corrected Pixel Value of the Imaging Pixel into the SDRAM)

The AF pixel interpolation unit 45 stores the pixel values of the distant imaging pixels corrected by the weighting coefficients and the pixel values of the proximal imaging pixels corrected by the prediction errors, in the SDRAM 27 (S-54).

As described above, in the third pixel interpolation processing, the above-described correction processing is repeatedly executed two times. After the correction processing is repeatedly executed two times, the second pixel interpolation processing is carried out.

(Second Pixel Interpolation Processing)

The AF pixel interpolation unit 45 executes the above-described second pixel interpolation processing by using the pixel values of the imaging pixels stored in the SDRAM 27 (S-55). Accordingly, the pixel values of the imaging pixels corresponding to the AF pixels are calculated. Specifically, the pixel values of the AF pixels are interpolated.

(Storage of the Interpolated Pixel Value of the AF Pixel into the SDRAM)

The AF pixel interpolation unit 45 stores the pixel values of the AF pixels interpolated through the second pixel interpolation processing (S-55), in the SDRAM 27.

In the third pixel interpolation processing, by repeatedly executing the correction processing two times, the smoothing processing with respect to the pixel values of the imaging pixels in the neighborhood of the AF pixel columns is effectively performed. When the smoothing processing is effectively performed, it is possible to reduce the influence of color mixture due to the flare generated in the imaging pixel adjacent to the AF pixel. Further, since the interpolation processing with respect to the AF pixel is conducted by using the pixel value of the imaging pixel in which the influence of color mixture is reduced, it is possible to obtain, also in the AF pixel, the pixel value in which the influence of color mixture due to the generated flare is reduced. Specifically, it is possible to obtain an image in which the influence of flare is reduced.

It should be noted that, while the array direction of the AF pixels is set to the horizontal scanning direction in the present embodiment, the present invention is not limited to this case, and the AF pixels may be arrayed in the vertical scanning direction or another direction.

It should be noted that, while each of the AF pixels is a focus detecting pixel performing the pupil division for light flux from the left side and the right side in the present embodiment, the present invention is not limited to this case, and each of the AF pixels may be a focus detecting pixel having a pixel performing the pupil division for light flux from the left side and the right side.

It should be noted that, while the electronic camera is explained in the present embodiment, it is not necessary to limit the present invention to this case and it is possible to cause an image processing apparatus, which takes in an image obtained by an electronic camera and performs image processing, to execute the processing in the flowcharts of FIG. 6, FIG. 7, FIG. 12, and FIG. 14. Furthermore, other than this case, it is possible to apply the present invention to a program for realizing the processing in the flowcharts of FIG. 6, FIG. 7, FIG. 12, and FIG. 14 by a computer. It should be noted that preferably this program is stored in a computer readable storage medium such as a memory card, an optical disk, and a magnetic disk.

The many features and advantages of the embodiments are apparent from the detailed specification and, thus, it is intended by the appended claimed to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A flare determination apparatus, comprising:
an image input unit inputting an image;
an image correction unit correcting the image using a correction coefficient to be set based on a gain value for white balance processing depending on a light source type;
a region detection unit detecting a region included in a predetermined color component range from the image being corrected by the image correction unit;
a determination unit determining whether or not a flare is generated in the region being detected by the region detection unit;
a matrix determination unit obtaining a second color space conversion matrix by correcting a first color space conversion matrix to be used when converting a color space of the image being input by the image input unit using the correction coefficient to be set based on the gain value for the white balance processing depending on the light source type; and
a high intensity region extraction unit extracting a region of pixels having an intensity value exceeding a threshold value set in advance among pixels included in the image, wherein
the image correction unit converts the color space of the image using the second color space conversion matrix,
the region detection unit detects the region included in the predetermined color component range from the image having been converted in the color space by the image correction unit, and
the region detection unit executes color space conversion using the second color space conversion matrix on the region being extracted by the high intensity region extraction unit.

2. The flare determination apparatus according to claim 1, wherein
the second color space conversion matrix converts pixel values of pixels included in a region where color mixing caused by the flare is generated into pixel values included in the predetermined color component range.

3. The flare determination apparatus according to claim 1, further comprising
a threshold calculation unit obtaining the threshold value based on a histogram generated by using each intensity value of the pixels included in the image.

4. The flare determination apparatus according to claim 1, wherein
the high intensity region extraction unit extracts a region of pixels exceeding the threshold value among pixels which are included in the image and having the intensity value not saturated.

5. The flare determination apparatus according to claim 1, wherein
the region detection unit detects a region included in the predetermined color component range from a region excluding pixels which are included in the image and having unsaturated pixel values.

6. The flare determination apparatus according to claim 1, wherein
the determination unit determines whether or not the flare is generated in the region using evaluation values including at least two of a total area of the region included in the predetermined color component range, a space dispersion value/the total area of the region, and an average value of an edge amount of an intensity component.

7. The flare determination apparatus according to claim 1, wherein
the determination unit determines whether or not the flare is generated in the region using evaluation values including a total area of the region included in the predetermined color component range, a space dispersion value/the total area of the region, and an average value of an edge amount of an intensity component.

8. The flare determination apparatus according to claim 1, wherein
the predetermined color component range is a color component range being magenta.

9. A non-transitory computer readable storage medium storing a flare determination program capable of causing a computer to execute:
an image input step inputting an image;
an image correction step correcting the image using a correction coefficient to be set based on a gain value for white balance processing depending on a light source type;
a region detection step detecting a region included in a predetermined color component range from the image being corrected by the image correction step;
a determination step determining whether or not a flare is generated in the region being detected by the region detection step;
a matrix obtaining step obtaining a second color space conversion matrix by correcting a first color space conversion matrix to be used when converting a color space of the image being input by the image input step using the correction coefficient to be set based on the gain value for the white balance processing depending on the light source type; and
a high intensity region extraction step of extracting a region of pixels having an intensity value exceeding a threshold value set in advance among pixels included in the image, wherein
the image correction step includes converting the color space of the image using the second color space conversion matrix,
the region detection step includes detecting the region included in the predetermined color component range from the image having been converted in the color space by the image correction step, and
the region detection step includes executing color space conversion using the second color space conversion matrix on the region being extracted in the high intensity region extraction step.

10. An image processing apparatus comprising: a flare determination apparatus, comprising: an image input unit inputting an image; an image correction unit correcting the image using a correction coefficient to be set based on a gain value for white balance processing depending on a light source type; a region detection unit detecting a region included in a predetermined color component range from the image being corrected by the image correction unit; and a determination unit generating a determination result indicating whether or not a flare is generated in the region being detected by the region detecting unit; wherein the image processing apparatus further comprises: an imaging element receiving object light and outputting an image signal generating the image, the imaging element including imaging pixels and focus detecting pixels; an image processing unit performing image processing including white balance processing on the image signal; and an interpolation processing unit executing interpolation processing, based on the determination result in the flare determination apparatus, on pixel values of the imaging pixels and pixel values of the focus detecting pixels.

11. The image processing apparatus according to claim 10, wherein
   the image to be input into the flare determination apparatus includes an evaluation image to be used when setting the gain value in the white balance processing.

* * * * *